United States Patent
Nguyen et al.

(10) Patent No.: US 7,473,515 B2
(45) Date of Patent: Jan. 6, 2009

(54) THERMALLY REACTIVE NEAR-INFRARED ABSORBING ACETAL COPOLYMERS, METHODS OF PREPARATION AND METHODS OF USE

(75) Inventors: My T Nguyen, Kirkland (CA); Marc-Andre Locas, Pierrefonds (CA)

(73) Assignee: American Dye Source, Inc., Baie D'Urfé (CA)

( * ) Notice: Subject to any disclaimer, the term of this patent is extended or adjusted under 35 U.S.C. 154(b) by 209 days.

(21) Appl. No.: 11/421,608

(22) Filed: Jun. 1, 2006

(65) Prior Publication Data

US 2006/0275698 A1 Dec. 7, 2006

Related U.S. Application Data

(60) Provisional application No. 60/722,977, filed on Oct. 4, 2005, provisional application No. 60/686,917, filed on Jun. 3, 2005.

(51) Int. Cl.
*G03F 7/004* (2006.01)

(52) U.S. Cl. .............. 430/302; 430/270.1; 101/465; 101/467; 525/61

(58) Field of Classification Search .......... 430/270.1, 430/302; 525/61; 101/465, 467
See application file for complete search history.

(56) References Cited

U.S. PATENT DOCUMENTS

| | | | |
|---|---|---|---|
| 5,698,360 A | 12/1997 | Timpe et al. | |
| 5,849,842 A | 12/1998 | Timpe et al. | |
| 5,925,491 A | 7/1999 | Baumann et al. | |
| 5,985,996 A | 11/1999 | Baumann et al. | |
| 6,087,066 A | 7/2000 | Baumann et al. | |
| 6,124,425 A | 9/2000 | Nguyen | |
| 6,177,182 B1 | 1/2001 | Nguyen | |
| 6,255,033 B1 | 7/2001 | Levanon et al. | |
| 6,270,938 B1 | 8/2001 | Gandini et al. | |
| 6,420,087 B1 | 7/2002 | Bennett et al. | |
| 6,461,795 B1 | 10/2002 | McCullough et al. | |
| 6,506,533 B1 * | 1/2003 | Kottmair et al. | 430/190 |
| 6,541,181 B1 | 4/2003 | Levanon et al. | |
| 6,596,460 B2 | 7/2003 | Timpe et al. | |
| 6,613,494 B2 | 9/2003 | Savariar-Hauck et al. | |
| 6,667,137 B2 * | 12/2003 | Kottmair et al. | 430/18 |
| 6,777,164 B2 * | 8/2004 | Horne et al. | 430/278.1 |
| 6,808,858 B2 | 10/2004 | Fuss et al. | |
| 7,279,263 B2 * | 10/2007 | Goodin | 430/157 |

FOREIGN PATENT DOCUMENTS

| | | |
|---|---|---|
| EP | 0 823 327 B1 | 2/1998 |
| EP | 0 909 657 A2 | 4/1999 |
| WO | WO 97/39894 | 10/1997 |
| WO | WO 98/42507 | 10/1998 |
| WO | WO 99/11458 | 3/1999 |
| WO | WO 2004/020484 A1 | 3/2004 |
| WO | WO 2005/123412 A1 | 12/2005 |

* cited by examiner

*Primary Examiner*—John S Chu
(74) *Attorney, Agent, or Firm*—Goudreau Gage Dubuc

(57) ABSTRACT

Described herein are novel thermally reactive near-infrared absorbing acetal copolymers that undergo chemical and physical changes upon exposure to near-infrared radiation. Also described are the methods of preparation of the novel acetal copolymers starting either with vinyl-alcohol polymers or with acetal copolymers. Also described are the methods of use of the new near-infrared absorbing acetal copolymers in coatings used in lithographic offset printing plates that can be directly imaged with near-infrared laser imaging devices in computer-to-plate and digital offset printing technologies. The novel acetal copolymers are also useful in photoresist applications, rapid prototyping of printed circuit boards and chemical sensor development.

71 Claims, 13 Drawing Sheets

THERMALLY REACTIVE NEAR-INFRARED ABSORBING ACETAL COPOLYMERS, METHODS OF PREPARATION AND METHODS OF USE

CROSS REFERENCE TO RELATED APPLICATIONS

This application claims priority on U.S. provisional application No. 60/686,917, filed on Jun. 3, 2005 and U.S. provisional application No. 60/722,977, filed on Oct. 4, 2005. All documents above are herein incorporated by reference.

FIELD OF THE INVENTION

This invention relates to novel acetal copolymers. More specifically, the novel copolymers are thermally reactive near-infrared absorbing copolymers. This invention further extends to the methods of preparation and methods of use of the novel materials. The novel acetal copolymers are particularly useful in the preparation of lithographic printing plates for computer-to-plate and digital offset press technologies, but their usefulness also extends to photoresist applications, rapid prototyping of printed circuit boards and chemical sensor development.

BACKGROUND OF THE INVENTION

The use of acetal copolymers for the production of lithographic offset printing plates is well known in the prior art because of their excellent film forming properties, good mechanical strength and superior chemical resistance on press. For example, U.S. Pat. Nos. 5,698,360 and 5,849,842 taught to prepare and utilize acetal copolymers containing sulfonamido functional groups as binder resins in UV photosensitive compositions used for conventional negative lithographic offset printing plates. Similarly, U.S. Pat. Nos. 5,925,491 and 5,985,996 taught that the use of acetal copolymers containing amido functional groups terminated with either hydrogen, C1-C8 saturated hydrocarbon, C1-C8 unsaturated hydrocarbon, or carboxylic acid functional groups as binder resins in UV photosensitive compositions leads to improved exposure and developing speeds. Furthermore, U.S. Pat. Nos. 6,087,066 and 6,270,938 taught that acetal copolymers containing meleinimido, funylvinylidene, thienylvinylidene and pyrrolyvinylidene functional groups used as binder resins in UV photosensitive compositions also lead to improved exposure and developing speeds. Also, U.S. Pat. Nos. 6,596,460 and 6,808,858 taught to prepare and use acetal copolymers containing azido, carboxylic acid or sulfonic acid functional groups as binder resins in UV photosensitive compositions to improve exposure and developing speeds.

Positive working lithographic offset printing plates containing near-infrared (NIR) laser radiation sensitive polymeric coatings are also known in the prior art. For example, Parsons, WO 9739894A1; Nagasaka, EP 0823327B1; Miyake, EP 0909657A2; West, WO 9842507A1; and Nguyen, WO 9911458A1 taught to prepare heat sensitive coating comprising a polymeric substance, a near-infrared absorbing compound and a dissolution inhibiting compound. In these coating compositions, the near-infrared absorbing and dissolution inhibiting compounds inhibit the polymeric substance from dissolving in the liquid developer by forming a network structure via hydrogen bonding or ionic interactions. Upon imaging with near-infrared laser light, this network structure is disrupted and thus, the exposed area becomes more soluble in the liquid developer, while the network structure of non-exposed areas is conserved and prevents the dissolution of this area (image area). However, the difference in solubility between the exposed and non-exposed areas varies during storage and usage, which makes these lithographic printing plates very difficult to process. For the printing plates that are just manufactured, the network structure in the coating composition is relatively weak and the non-exposed area is likely to be attacked by the liquid developer during processing, which leads to poor image quality. If the printing plates have been stored for some time, the network structure in the coating composition is very strong and makes it difficult to remove the laser-exposed area with the liquid developer. This phenomenon also leads to poor image quality of the printing products because of the background toning that occurs in such cases.

Different approaches have been taught in prior art to overcome the above-mentioned problems. For examples, U.S. Pat. No. 6,461,795 taught that, in order to accelerate the formation of a stable network structure within the coating composition, the lithographic printing plates must be heated at a preferable temperature between 50 and 60° C. in a low relative humidity atmosphere for several hours before shipment to the customers. Alternatively, U.S. Pat. No. 6,613,494 taught to apply a thin over-layer to protect the non-exposed area of the polymeric coating from the attack of the liquid developer.

U.S. Pat. No. 6,420,087 taught to prepare coating compositions for positive working lithographic printing plates containing siloxane compounds acting as image protecting agents that reduce the dissolution of the non-exposed areas during developing. However, the presence of these siloxane compounds made difficult the coating of the plates with roller coating techniques, caused phase separation in the coating solution and provoked the apparition of pinholes. In addition, these siloxane compounds are not soluble in alkaline developers, which causes sludge build-up in the processor, redeposit on the printing plates and a shortened lifetime of the developer.

WO patent application WO04020484A1 taught to prepare coating compositions consisting of acetal copolymers containing carboxylic acid, sulfonic acid and phosphoric acid terminated pendant groups, Novolak resin, near-infrared absorbing dyes, visible dyes, and image protecting agents for use in the production of thermally sensitive positive working lithographic offset printing plates having a high chemical resistance. Such coating compositions require a one-day post-production heat treatment at 50° C. in order to keep the image area from being attacked by the developer.

U.S. Pat. Nos. 6,255,033 and 6,541,181 taught to prepare acetal copolymers containing carboxylic acid, hydroxy, halide, methoxy and acetylene functional groups for use as binder resins in the production of positive working lithographic offset printing plates that can be imaged with near-infrared laser radiation. It is important to note that these coating compositions require an adhesion promoting agent, a near-infrared absorbing dye that converts light into heat and a large amount of visible acts as a dissolution inhibitor. In practice, high loading level of near-infrared dye and visible dye are required to differentiate exposed and non-exposed areas during development. However, the presence of such a large quantity of small organic molecules in the coating compositions reduces the mechanical strength of the coating, causes blooming during storage and severe staining of the processor during developing process after imaging.

U.S. Pat. Nos. 6,124,425 and 6,177,182 taught to prepare heat sensitive polymeric coating compositions for positive working lithographic printing plates comprising near-infrared absorbing chromophores grafted on the backbone of Novolak, acrylate or methacrylate based polymers. Optionally, these coating compositions may contain other binder resins and film-forming additives. Unfortunately, these coating compositions are difficult to functionalize, have only a limited mechanical strength, produce relatively short-lived plates and cannot be used with UV inks without baking.

Thus, there remains a need for new polymeric coating compositions for lithographic printing plates. The present invention seeks to meet these needs and other needs.

SUMMARY OF THE INVENTION

More specifically, in accordance with the present invention, there is provided an acetal copolymer having attached thereto a radiation-absorbing segment having at least one strong absorption peak between 700 and 1100 nm.

More specifically, the copolymer of the present invention may have the following general structure:

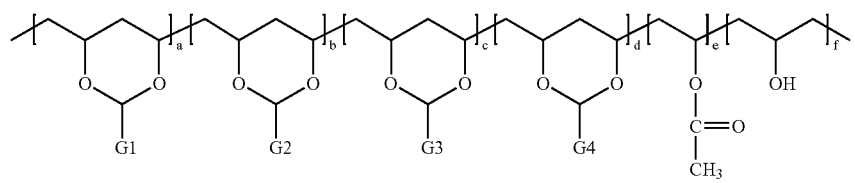

wherein:
G1 represents a processing segment that provides solubility in aqueous solutions having pH between 2.0 and 14.0;
G2 represents a processing segment that provides film-forming properties and solubility in an organic solvent;
G3 represents a thermal reactive segment that undergoes chemical or physical changes upon exposure to near-infrared radiation;
G4 represents a radiation-absorbing segment having one or more strong absorption peak between 700 and 1100 nm;
a, b, c, d, e, and f may vary from 0.02 to 0.98; and
any of

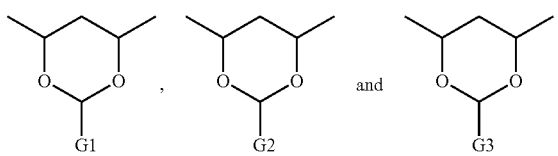

may independently be replaced by

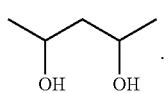

The present invention also relates to the use of the copolymer of the invention in the preparation of a coating and to coatings which comprise the copolymer of the invention or a mixture thereof.

The coatings of the invention may be used in lithographic printing plates, photoresist applications, rapid prototyping of printed circuit boards or chemical sensor development.

The present invention also relates to lithographic printing plates, photoresists and chemical sensors comprising the copolymer of the invention or a mixture thereof.

The invention also relates to processes for preparing the copolymer of the invention. A first process comprises reacting polyvinyl alcohol with a NIR chromophore containing an aldehyde functional group in the presence of an acid acting as catalyst. Another process comprises reacting an acetal copolymer containing a first functional group with a NIR chromophore containing a second functional group, wherein:

when said first functional group is a carboxylic acid, said second functional group is an amino, when said first functional group is a amino, said second functional group is an carboxylic acid, when said first functional group is a mercapto or a hydroxy, said second functional group is a halide acid, and when said first functional group is a halide, said second functional group is a a mercapto or a hydroxy acid.

Other embodiments and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DETAILED DESCRIPTION OF THE INVENTION

Figure 1:
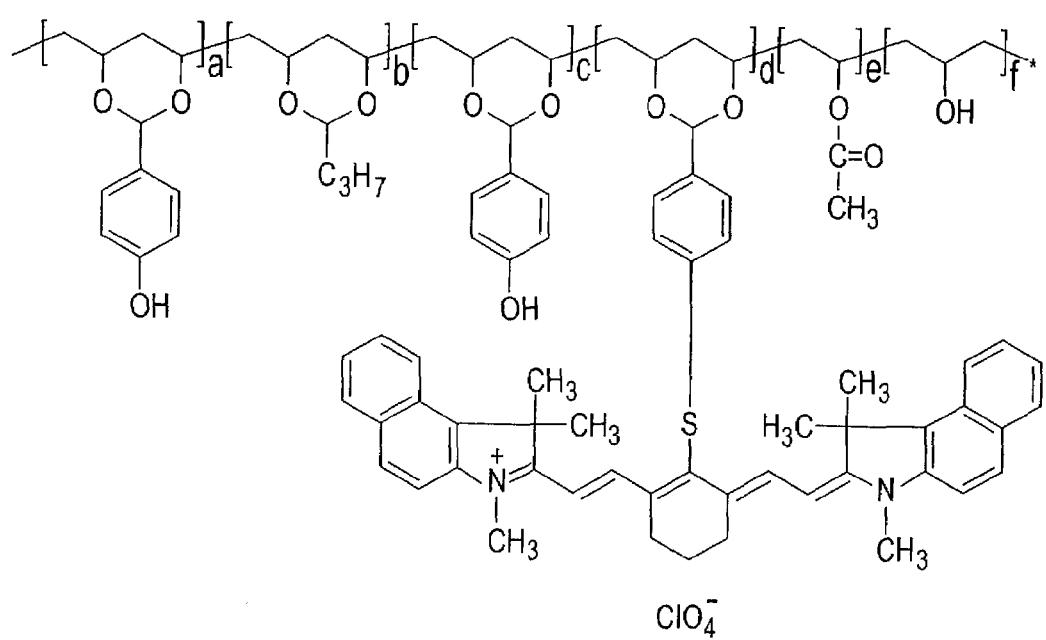
FIG. 1 is the ideal structure of M1-S01 thermally reactive near-infrared absorbing acetal copolymer.

This invention relates to new thermally reactive near-infrared absorbing acetal copolymers that undergo chemical and physical changes upon exposure to near-infrared radiation.

More specifically, the acetal copolymer of the invention has attached thereto a radiation-absorbing segment that exhibit at least one strong absorption peak between 700 and 1100 nm.

The copolymers of the invention may have a molecular weight greater than about 5,000 g/mol. They may be soluble in organic solvents and/or in aqueous solutions.

The copolymers of the invention may have the following general structure:

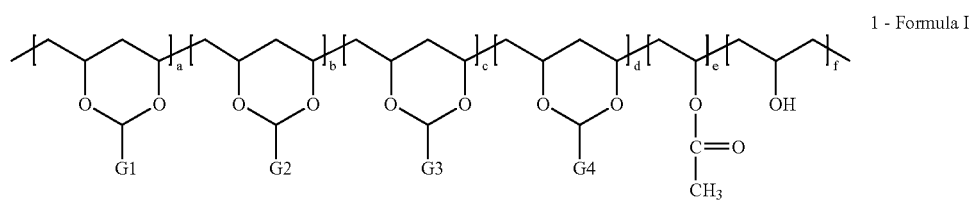

1 - Formula I wherein:

G1 represents an optional processing segment that provides solubility in aqueous solutions having pH between 2.0 and 14.0;

G2 represents an optional processing segment that provides film-forming properties and solubility in organic solvents, such as alcohol, ketone and esters;

G3 represents an optional thermal reactive segment that undergoes chemical and physical changes upon exposure to near-infrared radiation;

G4 represents a radiation-absorbing segment that exhibits one or more strong absorption peaks between 700 and 1100 nm. Optionally, G4 may also exhibit strong absorption peaks between 400 and 1100 nm;

a, b, c, d, e, and f are molar ratios that can vary from 0.02 to 0.98.

When G1, G2 and/or G3 is absent, the following repeat unit of the copolymer:

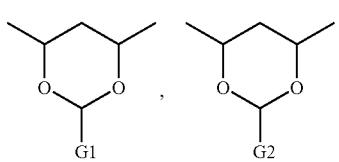

and are replaced by

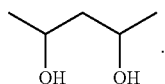

The G1 segments may be alkyl and aryl compounds containing hydroxy, carboxylic acid, sulfonic acid, phosphoric acid, dialkylamino, trialkylammonium salts, ethylene oxide or propylene oxide functional groups. More specifically, the G1 segments of this invention may be:

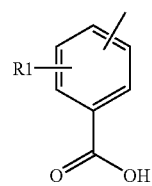

2

-continued

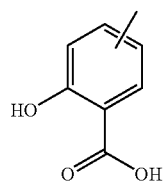

3

4

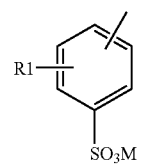

5

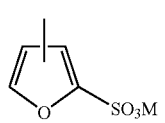

6

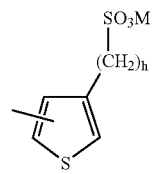

-continued

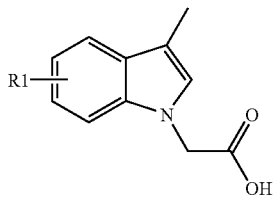
7

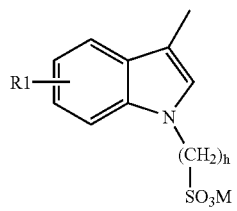
8

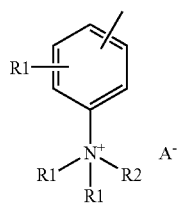
9

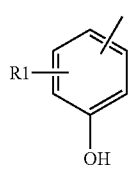
10 wherein:
R1 is H, C1-C8 alkyl, alkoxy or halide;
R2 is C1-C8 alkyl or alkoxy;
M is hydrogen or sodium;
A is halide.

The G2 segments of this invention may be C1-C10 alkyl and alkyl substituted aryl groups.

The G3 segments of the invention may be alkyl and aryl compounds containing functional groups that can participate in hydrogen bonding or ionic bonding formation such as —OH, —SH, —CONHR, —NH$_2$, —NHR, —NH—CO—NHR, wherein R is hydrogen, C1-C10 alkyl chain or a substituted aryl group. More specifically, G3 may be:

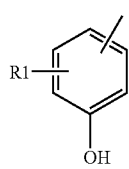
11

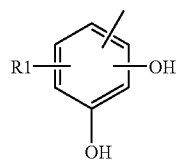
12

-continued

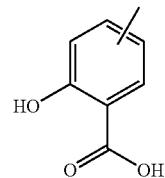
13

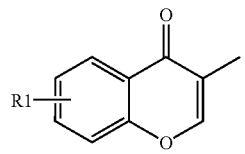
14

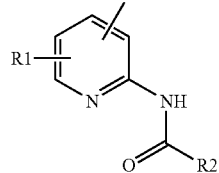
15

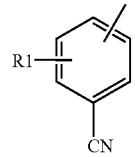
16

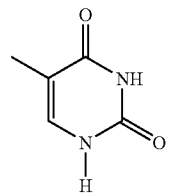
17

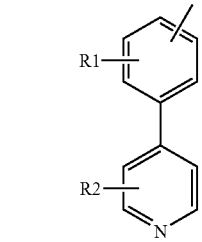
18

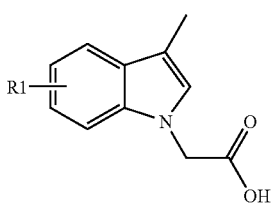
19

-continued

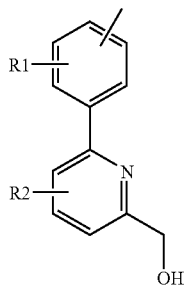
20

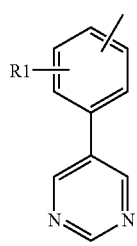
21

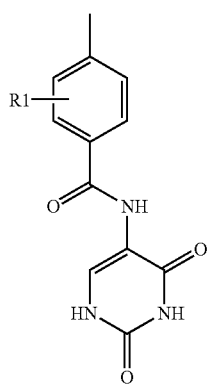
22

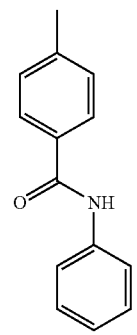
23 wherein:
R1 is H, C1-C8 alkyl, alkoxy or halide;
R2 is C1-C8 alkyl or alkoxy.

The G3 segments may also contain functional groups that may participate in the formation of a covalent bond, such as acrylate, methacrylate, and vinyl ether.

The G4 segments of this invention may be:

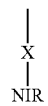
24 - Formula 2 wherein:
NIR is a near-infrared absorbing chromophore that exhibits one or more strong absorption peaks between 700 and 1100 nm and may optionally exhibit strong absorption peaks between 400 and 700 nm;
X is a spacer group that links the near-infrared absorbing chromophore to the acetal copolymer backbone.

The spacer groups (X) may be:

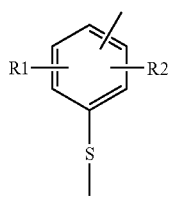
25

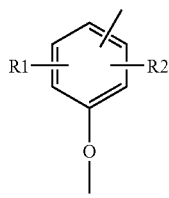
26

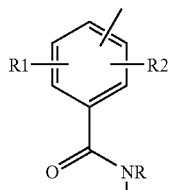
27

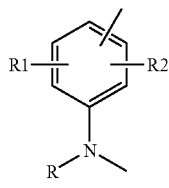
28

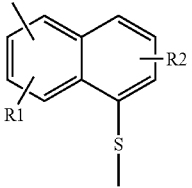
29

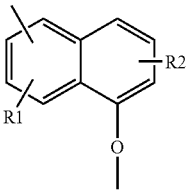
30

-continued
31
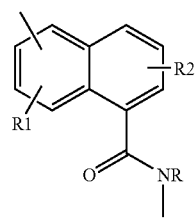
32
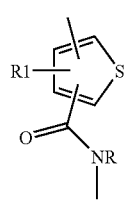
33
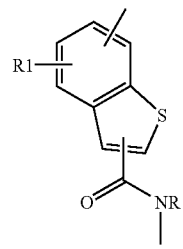
34
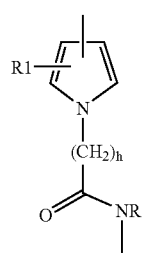
35
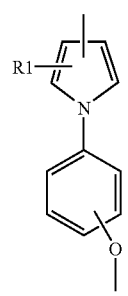
36
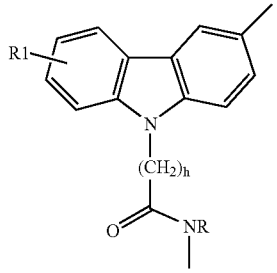
-continued
37
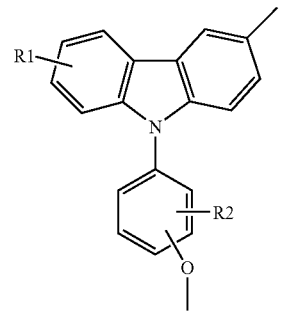
39
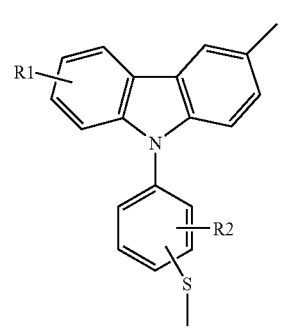
40
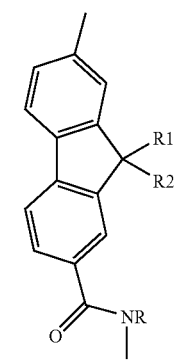
41
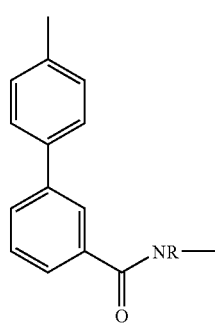
42
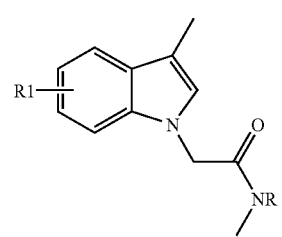

-continued

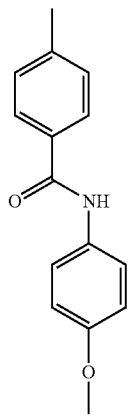

43 wherein
R is C1-C8 alkyl, alkyloxy or aryl;
R1 and R2 are identical or different and represent H, C1-C8 alkyl, C1-C8 alkoxy or halide.

The near-infrared absorbing chromophores (NIR chromophores) of this invention may be near-infrared absorbing organic compounds containing cyanine and/or arylimine functional groups. More specifically, the NIR chromophores of this invention may be:

44 - NIR Chromophore I

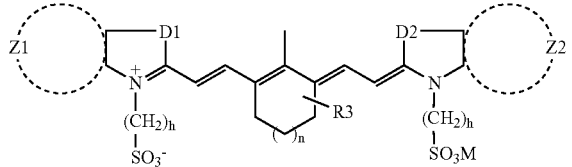

45 - NIR Chromophore II

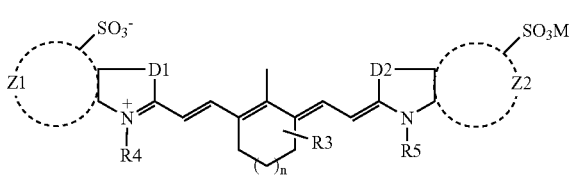

46 - NIR Chromophore III

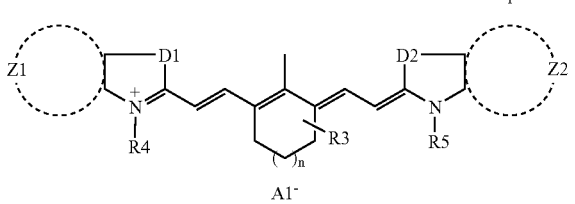

-continued

47 - NIR Chromophore IV

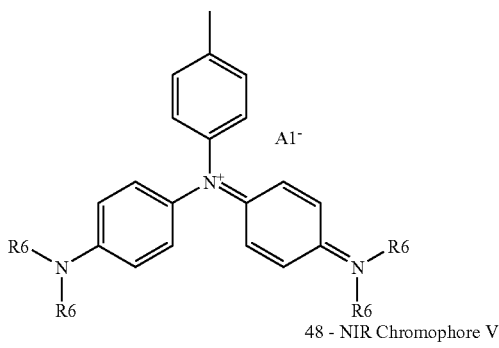

48 - NIR Chromophore V

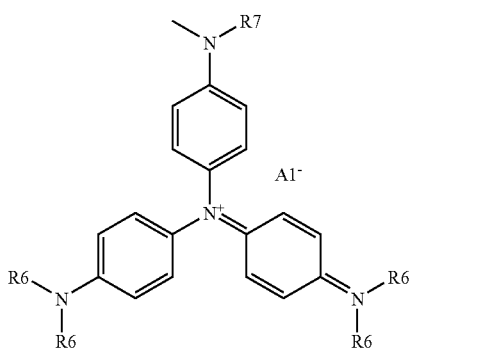

wherein:
D1 and D2 are identical or different and represent —O—, —S—, —Se—, —CH=CH—, and —C(CH3)2-;
R3 is hydrogen, C1-C8 alkyl chain, and C1-C8 alkoxy.
R4 is C1-C18 alkyl chain, C1-C18 alkyl chain terminating with hydroxy and carboxylic acid, and ethylene oxide chain
R5 represents hydrogen or alkyl;
R6 and R7 are identical or different and represent alkyl, aryl alkyl, hydroxy alkyl, amino alkyl, carboxy alkyl, sulfo alkyl;
Z1 and Z2 are identical or different and represent sufficient atoms to form a fused substituted or unsubstituted aromatic rings, such as phenyl and naphthyl;
h represents integer number from 2 to 8;
n represents 0 or 1;
M represents:
hydrogen or a cationic counter ion selected from Na, K, tetraalkylammonium that does not have any absorption between 400 and 700 nm,
a cationic portion of cyanine dyes similar to NIR Chromophore III and V that exhibits a strong absorption peak between 700 and 980 nm, i.e.:

49

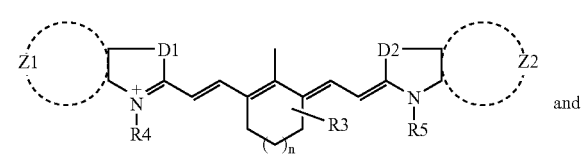

and

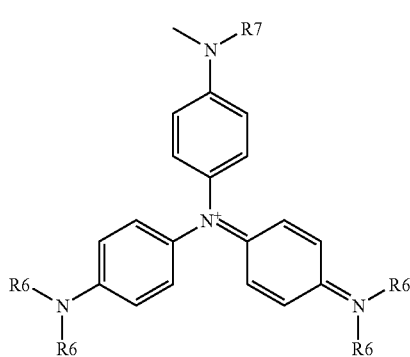

wherein D1, D2, R3, R4, R5, R6, R7, Z1, Z2, and n are as above, or a cationic counter ion that exhibits strong absorption peaks in the visible region between 400 and 700 nm. The most preferred visible absorbing cationic counter ions of this invention are the cationic portion of basic dyes, such as:

Basic blue 3, 7, 11, 26;
Basic red 9, 29;
Basic yellow 11;
Basic violet 3, 7, 14;

A1 represents:
- an anionic counter ion selected from bromide, chloride, iodide, tosylate, triflate, trifluoromethane carbonate, dodecyl benzosylfonate, tetraphehylborate, alkyltriphenylborate and tetrafluoroborate that does not exhibit absorption peaks between 400 and 700 nm,
- an anionic portion of cyanine dyes similar to NIR Chromophore I and II that exhibits a strong absorption peak between 700 and 850 nm. i.e.:

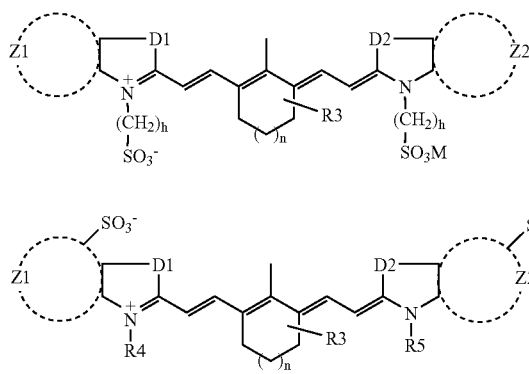

wherein D1, D2, Z1, Z2, R3, R4, R5, M, h and n are as above, or an anionic counter ion that exhibits strong absorption peaks between 400 and 700 nm. The most preferred visible absorbing anionic counter ions of this invention are the anionic portion of acid dyes, such as:

Acid blue 1, 7, 25, 29, 40, 41, 45, 80, 83, 92, 93, 113, 120, 129, and 161;
Acid green 25, 27, 41;
Acid orange 8, 51, 63;
Acid red 4, 40, 88, 103, 114, 151, 183;
Acid violet 5, 7, 17;

Understood that the acetal copolymer of the invention comprises more than one repeat unit comprise a G4 segments, the different G4 segments of the polymer of this invention may comprise different near-infrared absorbing chromophores.

The present invention also relates to methods of producing the copolymers of the invention starting either with vinyl-alcohol polymers or with acetal copolymers.

The new near-infrared absorbing acetal copolymers can either be produced by the reaction of polyvinyl alcohol polymers with NIR chromophores containing aldehyde functional group or by the reaction of acetal copolymers containing carboxylic acid, mercapto, amino, hydroxy or halide reactive functional groups with NIR chromophores containing the same reactive functional groups.

The acetal copolymers of the invention may be produced by the reaction of polyvinyl alcohol with NIR chromophores containing aldehyde functional groups in the presence of an acid such as sulfuric acid, hydrochloric acid, or toluene sulfonic acid acting as a catalyst.

The aldehyde-containing NIR chromophores may be:

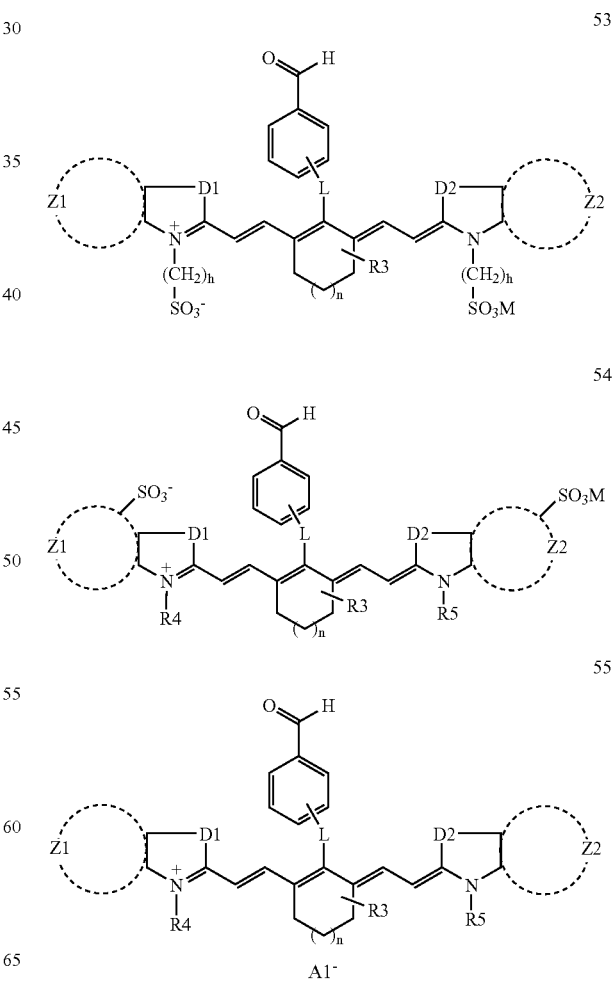

-continued

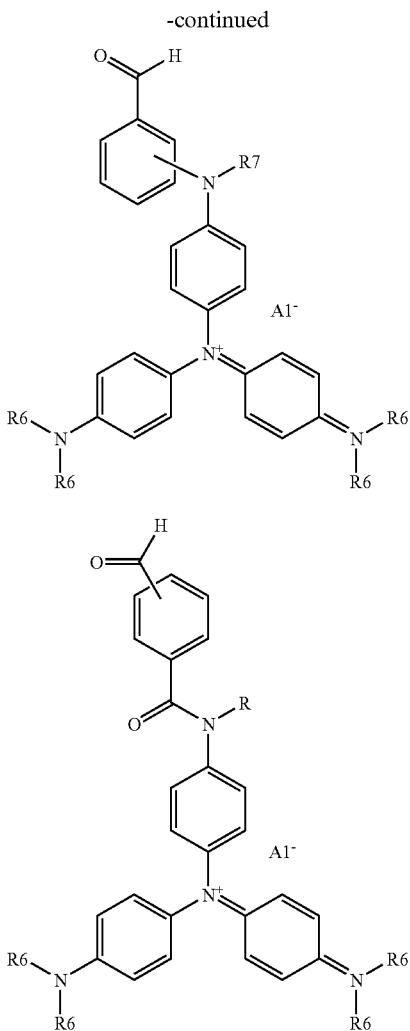

wherein L is S, O, or —CO—NR—.

The acetal copolymers of the invention may be produced by the reaction of acetal copolymers containing reactive functional groups such as carboxylic acid, mercapto, amino, hydroxy and halide with NIR chromophores containing a functional group that will react with that of the acetal copolymer. The pairs of functional groups may be:

| Functional group contained in the acetal copolymers | Functional group required for the NIR chromophores |
|---|---|
| Carboxylic acid | Amino |
| Amino | Carboxylic acid |
| Mercapto and hydroxy | Halide |
| Halide | Mercapto and hydroxy |

The present invention also relates to the use of the new acetal copolymers with near-infrared laser imaging devices for direct digital imaging by near-infrared (NIR) laser radiation. The novel acetal copolymers can be use as coating materials and are particularly useful in the preparation of lithographic printing plates for computer-to-plate and digital offset press technologies. The novel copolymers may also be used in photoresist applications, rapid prototyping of printed circuit boards and chemical sensor development.

The copolymers of the invention may be used for producing coatings for lithographic offset printing plates. These lithographic offset printing plates may be directly imaged with near-infrared laser imaging devices in computer-to-plate and digital offset printing technologies. More specifically, such compositions comprising the copolymer of the invention may used in the production of thermally sensitive lithographic offset printing plates that comprise single- or multiple-layer coatings deposited on a substrate such as anodized aluminum, plastic films or paper.

For single-layer positive working lithographic offset printing plates, the coatings may be coated on anodized aluminum substrate or polyester film and may have coating weights between 1 and 5 $g/m^2$. More specifically, the coatings may comprise:

From 10 to 100% by weight of thermally reactive near-infrared absorbing acetal copolymers.

From 0 to 90% by weight of polymeric binder resins. These resins may be polymer and copolymer derived from Novolak, acrylate, methacrylate, and styrene containing functional groups such as hydroxy, carboxylic acid, sulfonic acid, urea, urethane, amido, imido and meleimide.

From 0 to 10% by weight of visible dyes. These dyes may be basic violet, basic blue and acid blue.

From 0 to 90% by weight of image-protecting agents. These image-protecting agents may be siloxane-containing oligomers, polymers and copolymers.

For two-layers positive working lithographic offset printing plates, the bottom layer may exhibit a different solubility in the alkaline developer different from that of the top layer.

The composition and weight for the top layer may be the same than that described above for single-layer positive working lithographic offset printing plates.

The bottom layer may weight between 0.2 and 3.0 $g/m^2$ and may comprise:

From 10 to 100% by weight of the acetal copolymers of the acetal copolymer of the invention soluble in aqueous solutions of pH between 1 and 13, but not soluble in organic solvents like ketone, alcohols and mixture thereof.

From 0 to 90% by weight of a cross-linking agent to allow the formation of a hydrophilic water insoluble coating layer. These cross-linking agents are may be ammonium zirconyl acetate, tri- and tetra-alkoxysilane, hydroxy titanate, hexamethoxymethyl melamine, aldehyde containing compounds and mixtures thereof.

The coating compositions were coated on aluminum substrates using a spin coater at 70° C. The aluminum substrate used was electro-grained and anodized with hydrochloric acid and sulfuric acid, respectively. It was then treated with an aqueous solution of NaF/NaH2PO4 or with polyvinyl phosphoric acid at 80° C. to improve its hydrophilicity. The surface roughness (Ra) and oxide weight of the employed aluminum substrate were around 0.5 and 4.2 $g/m^2$, respectively.

The different chemical product used in the examples of printing plate coating compositions presented hereafter are described in the following table:

| Glossary | |
|---|---|
| Thermolak ™ 7525 | Novolak-ester resin (American Dye Source, Inc., Baie d'Urfe, Quebec, Canada) |

-continued

Glossary

| | |
|---|---|
| ADS830AT | Infrared absorption dye ($\lambda_{max}$ = 830 nm) (American Dye Source, Inc., Baie d'Urfe, Quebec, Canada) |
| ADS775MI | Infrared absorption dye ($\lambda_{max}$ = 800 nm) (American Dye Source, Inc., Baie d'Urfe, Quebec, Canada) |
| Bacote 20 ™ | Ammonium zirconyl carbonate in water solution (Magnesium Elektron Inc., Flemington, New Jersey) |
| Basic violet 3 | Crystal violet Visible dye (Spectra Colors, Kearny, New Jersey, USA) |
| Silikophene ™ P50/X | Siloxane polymer in xylene (50% by weight) (Degussa, Parsippany, New Jersey, USA) |
| Dowanol ™ PM | 1-Methoxypropanol (Canada Color Corporation, St. Laurent, Quebec, Canada) |
| ADS500SF | Ionic and non-ionic surfactant mixture (American Dye Source, Inc., Baie d'Urfe, Quebec, Canada) |

The alkaline developer used in this invention is available from American Dye Source, Inc. and has the following composition:

| Components | Parts |
|---|---|
| De-mineralized water | 85.00 |
| Sodium metasilicate pentahydrate | 12.50 |
| ADS500SF | 2.50 |

This particular embodiment of the The present invention is illustrated in further details by the following non-limiting examples.

Synthesis of the Acetal Copolymers of the Invention

The synthesis of the thermally reactive near-infrared absorbing acetal copolymers of the invention was performed in a 3 necks glass reactor equipped with a water condenser, a mechanical stirrer, a dropping funnel and a nitrogen gas inlet. The molecular structures of the obtained acetal copolymers were determined by proton NMR and FTIR spectroscopy. The average molecular weight of the copolymers obtained was determined by size exclusion chromatography (SEC), using N,N-dimethylformamide (DMF) solution and calibrated with polystyrene standards. The UV-Visible near-infrared spectra of the synthesized polymers were measured in DMF solutions using a UV-VIS spectrophotometer (Model PC, Shimazu).

Method 1 (M1)—Synthesis by Reacting polyvinyl Alcohol with an Aldehyde-Containing NIR Chromophore Solvent-Soluble (S) Thermally Reactive Near-Infrared Absorbing Acetal Copolymers

EXAMPLE 1

Copolymer M1-S01 was synthesized by adding, by portions, 90 grams of polyvinyl alcohol (Celvol™ 103, an 98% hydrolyzed polyvinyl acetate having an average molecular weight of about 18,000) to a reaction flask containing 810 grams of dimethylsulfoxide (DMSO) at 60° C., under nitrogen atmosphere and with constant stirring. After complete dissolution, 3 ml of concentrated sulfuric acid, which acts as a catalyst for this reaction, were added to the flask. After thirty minutes, 25 grams of butyraldehyde (346.6 mmole, available from Sigma-Aldrich, Canada) were slowly added to the flask and the mixture was stirred at 60° C. for 2 hours. Then, 61 grams of 4-hydroxybenzaldehyde (499.5 mmole, available from Sigma-Aldrich, Canada) were slowly added to the flask and the mixture was stirred at 60° C. for 4 hours. Finally, a solution containing 100 ml of 1-methoxypropanol and 20 grams of 2-[2-[2-(4-formylbenzothio)-3-(1,3-dihydro-1,3,3-trimethyl-2H-benz[e]indol-2-ylidene)-ethylidene]-1-cyclo-hexen-1-yl]-ethenyl]-1,3,3-trimethyl-1H-benz[e]indolium perchlorate (25.5 mmole, available from American Dye Source, Inc.) was slowly added to the flask. The resulting mixture was stirred at 60° C. for another 4 hours after which the reaction product was precipitated in 10 liters of de-ionized water, filtered and washed copiously with water. It was then dried in air until constant weight.

The UV-Vis-NIR spectrum of M1-S01 was recorded in methanol and exhibited a strong absorption peak at 827 nm. The ideal structure of the M1-S01 near-infrared absorbing acetal copolymer is shown in FIG. 1 wherein a+c=49.90%, b=34.70%, d=2.55%, e=2.00% and f=10.85%.

EXAMPLE 2

Copolymer M1-S02 was synthesized by adding, by portions, 90 grams of polyvinyl alcohol (Celvol™ 103, an 98% hydrolyzed polyvinyl acetate having an average molecular weight of about 18,000) to a reaction flask containing 810 grams of DMSO at 60° C. under nitrogen atmosphere and with constant stirring. After complete dissolution, 3 ml of concentrated sulfuric acid were added to the flask. After thirty minutes, 25 grams of butyraldehyde (346.6 mmole, available from Sigma-Aldrich, Canada) were slowly added to the flask and the mixture was stirred at 60° C. for 2 hours. Then, 61 grams of 4-hydroxybenzaldehyde (499.5 mmole, available from Sigma-Aldrich, Canada) were slowly added to the flask and the mixture was stirred at 60° C. for 4 hours. Then, a solution containing 100 ml of 1-methoxypropanol and 20 grams of 2-[2-[2-(4-formylbenzothio)-3-(1,3-dihydro-1,3,3-trimethyl-2H-benz[e]indol-2-ylidene)-ethylidene]-1-cyclo-hexen-1-yl]-ethenyl]-1,3,3-trimethyl-1H-benz[e]indolium perchlorate (25.5 mmole, available from American Dye Source, Inc.) was slowly added to the flask and the resulting mixture was stirred at 60° C. for another 4 hours. Finally, a solution containing 100 ml of 1-methoxypropanol and 21.1 grams of acid blue 83 (25.5 mmole, available from Sigma-Aldrich, Canada) was slowly added to the reaction mixture. Stirring at 60° C. was continued for an additional 2 hours after which the dark blue polymer product obtained was precipitated in 10 liters of de-ionized water, filtered and washed with water until the washing solution was colorless. The product was then dried in air until constant weight.

Figure 2:
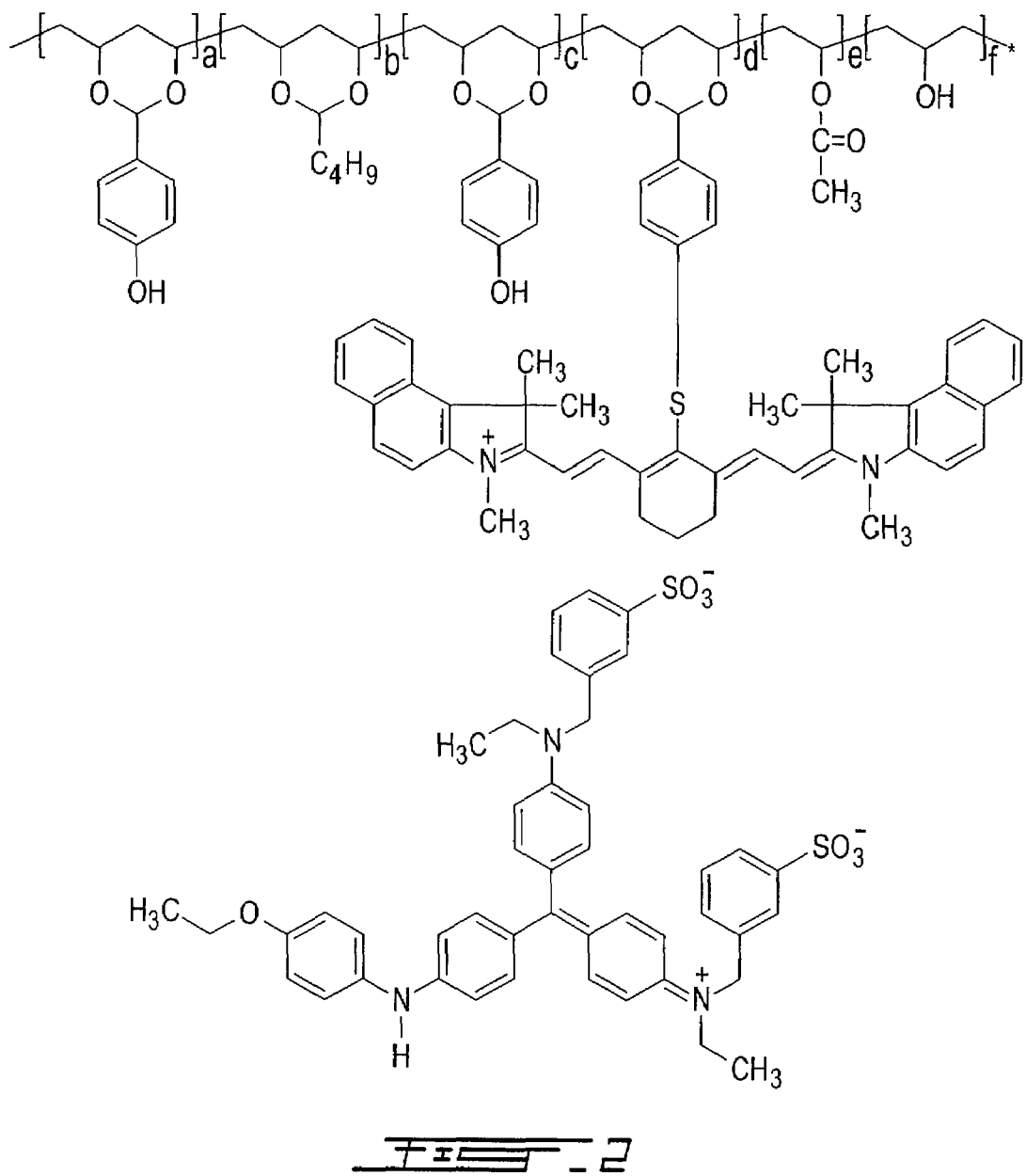
FIG. 2 is the ideal structure of M1-S02 thermally reactive near-infrared absorbing acetal copolymer.

The UV-Vis-NIR spectrum of M1-S02 was recorded in methanol solution and exhibited two peaks at 593 nm and 827 nm, which correspond to the absorption of the acid blue 83 anion and the near-infrared absorbing cation, respectively. The ideal structure of the M1-S02 near-infrared absorbing acetal copolymer is shown in FIG. 2 wherein a+c=49.90%, b=34.70%, d=2.55%, e=2.00% and f=10.85%.

EXAMPLE 3

Copolymer M1-S03 was synthesized in a way very similar to that of the M1-S01 near-infrared absorbing polymer described in Example 1. The only difference was that 23.1 grams of 2-[2-[2-[4-(4-formylphenylcarboxamido)ben-zothio]-3-[1,3-dihydro-1,3,3-trimethyl-2H-benz[e]indol-2- ylidene)-ethylidene]-1-cyclohexen-1-yl]-ethenyl]-1,3,3-trimethyl-1H-benz[e]indolium perchlorate (25.5 mmole, available from American Dye Source, Inc.) were used instead of the 20 grams of 2-[2-[2-(4-formylbenzothio)-3-(1,3-dihydro-1,3,3-trimethyl-2H-benz[e]indol-2-ylidene)-ethylidene]-1-cyclohexen-1-yl]-ethenyl]-1,3,3-trimethyl-1H-benz[e]indolium perchlorate that were used in Example 1. The dark green product obtained was precipitated in 10 liters of de-ionized water, filtered and washed copiously with water. It was then dried in air until constant weight.

Figure 3:
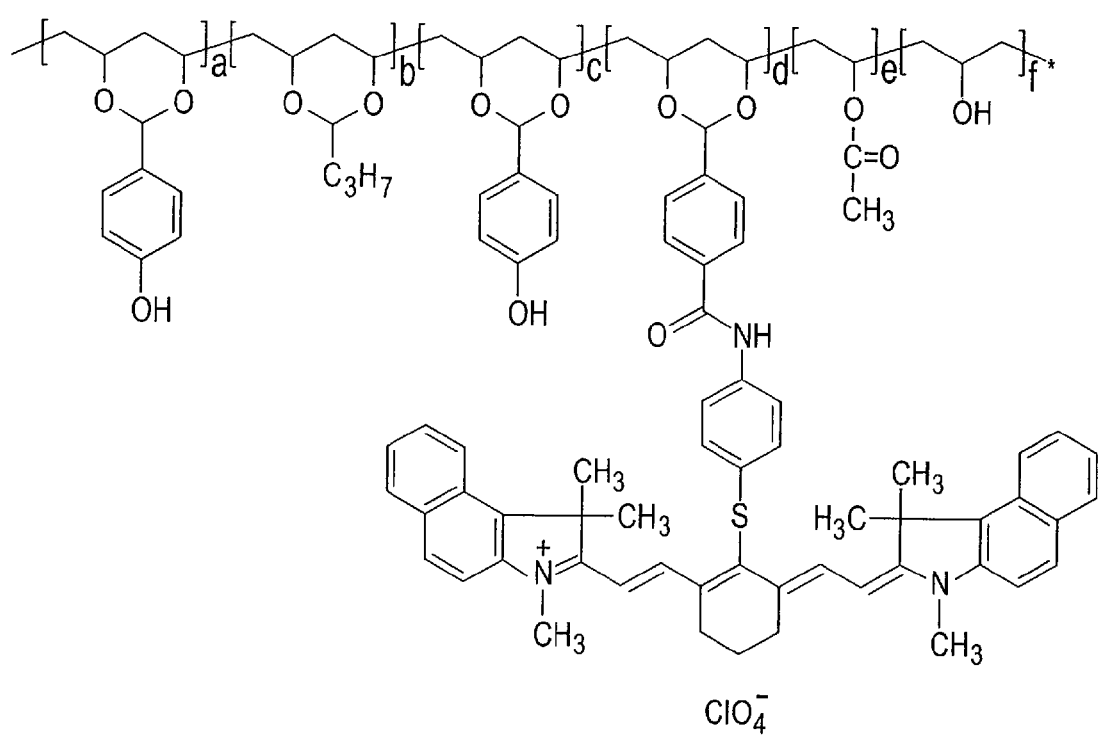
FIG. 3 is the ideal structure of M1-S03 thermally reactive near-infrared absorbing acetal copolymer.

The UV-Vis-NIR spectrum of M1-S03 was recorded in methanol and exhibited a strong near-infrared absorption peak at 825 nm. The ideal structure of the M1-S03 near-infrared absorbing acetal copolymer is shown in FIG. 3 wherein a+c=49%, b=35%, d=2.2%, e=2.0% and f=11.8%.

EXAMPLE 4

Copolymer M1-S04 was synthesized by adding, by portions, 90 grams of polyvinyl alcohol (Celvol™ 103, an 98% hydrolyzed polyvinyl acetate having an average molecular weight of about 18,000) to a reaction flask containing 600 ml of DMSO at 60° C., under nitrogen atmosphere and with constant stirring. After complete dissolution, 3 ml of concentrated sulfuric acid were added to the flask. After thirty minutes, 25 grams of butyraldehyde (346.6 mmole, available from Sigma-Aldrich, Canada) were slowly added to the flask and the mixture was stirred at 60° C. for 2 hours. Then, 61 grams of 4-hydroxybenzaldehyde (499.5 mmole, available from Sigma-Aldrich, Canada) were slowly added to the flask and the mixture was stirred at 60° C. for 2 hours. A solution containing 100 ml of 1-methoxypropanol and 23.7 grams of 2-[2-[2-(4-formylbenzothio)-3-(1,3-dihydro-3,3-dimethyl-1-(4-sulfobutyl)-2H-benz[e]indol-2-ylidene)ethylidene]-1-cyclohexen-1-yl]-ethenyl]-3,3-di-methyl-1-(4-sulfobutyl)-1H-benz[e]indolium, inner salt, free acid (25.5 mmole, available from American Dye Source, Inc.) was slowly added to the flask and stirring stir at 60° C. was continued for another 5 hours. Finally, a solution containing 100 ml of 1-methoxypropanol and 10.5 grams of crystal violet (available from Spectra Colors, New Jersey, USA) was slowly added to the reaction mixture that was stirred at 60° C. for additional 2 hours. The product obtained was precipitated in 10 liters of de-ionized water, filtered and copiously washed with water until the washing solution was colorless. It was then dried in air until constant weight.

Figure 4:
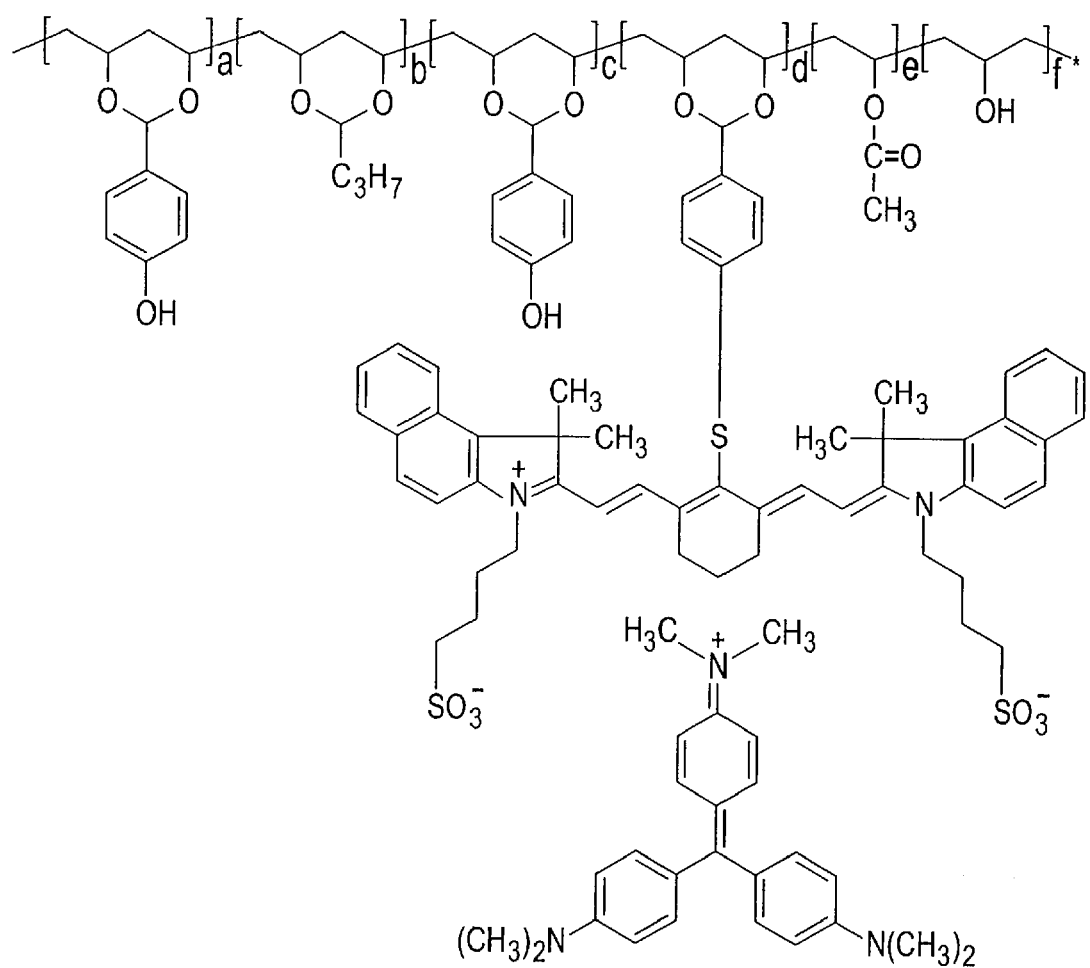
FIG. 4 is the ideal structure of M1-S04 thermally reactive near-infrared absorbing acetal copolymer.

The UV-Vis-NIR spectrum of M1-S04 was recorded in methanol and exhibited strong absorption peaks at 590 and 837 nm. The ideal structure of the M1-S04 near-infrared absorbing acetal copolymer is shown in FIG. 4 wherein a+c=49%, b=35%, d=2.2%, e=2.0% and f=11.8%.

EXAMPLE 5

Copolymer M1-S05 was synthesized by adding, by portions, 90 grams of polyvinyl alcohol (Celvol™ 103, an 98% hydrolyzed polyvinyl acetate having an average molecular weight of about 18,000) to a reaction flask containing 600 grams of DMSO at 60° C., under nitrogen atmosphere and with constant stirring. After complete dissolution, 5 ml of concentrated sulfuric acid were added to the flask. After thirty minutes, 25 grams of butyraldehyde (346.6 mmole, available from Sigma-Aldrich, Canada) were slowly added to the flask and the mixture was stirred at 60° C. for 2 hours. Then, 50 grams of 4-hydroxybenzaldehyde (409 mmole, available from Sigma-Aldrich, Canada) were slowly added to the flask and the mixture was stirred at 60° C. for 4 hours. A solution containing 50 ml of 1-methoxypropanol and 11 grams of 4-formylphenylcarboxamidobenzene (44.4 mmole, available from American Dye Source, Inc.) was then slowly added into the reaction mixture that was stirred at 60° C. for another 2 hours. Finally, a solution containing 100 ml of 1-methoxypropanol and 20 grams of 2-[2-[2-[4-(4-formylphenylcarboxamido)benzothio]-3-(1,3-dihydro-1,3,3-trimethyl-2H-benz[e]indol-2-ylidene)-ethylidene]-1-cyclohexen-1-yl]-ethenyl]-1,3,3-trimethyl-1H-benz[e]indolium perchlorate (25.5 mmole, available from American Dye Source, Inc.) was slowly added to the flask and the mixture was stirred at 60° C. for 4 hours. The product obtained was precipitated in 10 liters of de-ionized water, filtered and washed copiously with water. It was then dried in air until constant weight.

Figure 5:
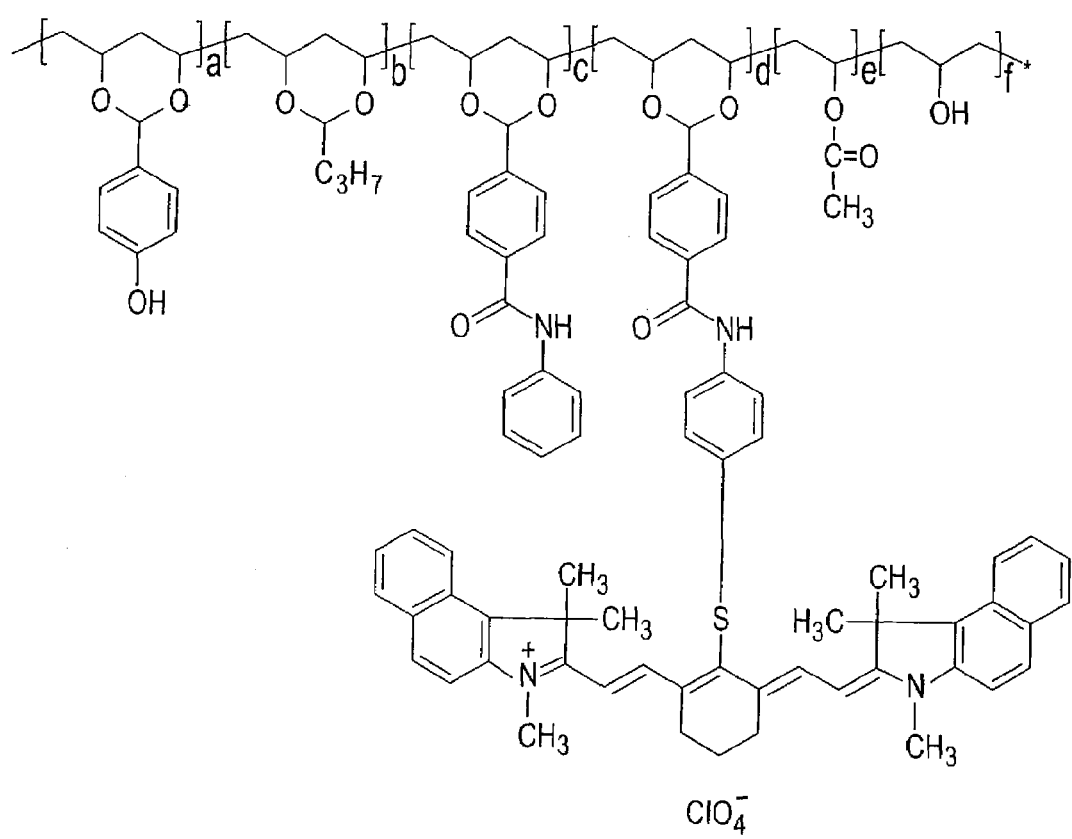
FIG. 5 is the ideal structure of M1-S05 thermally reactive near-infrared absorbing acetal copolymer.

The UV-Vis-NIR spectrum of M1-S05 was recorded in methanol and exhibited a strong absorption peak at 832 nm. The ideal structure of M1-S05 is shown in FIG. 5 wherein a=40.90%, b=34.70%, c=4.45%, d=2.55%, e=2.00% and f=15.40%.

EXAMPLE 6

Copolymer M1-S06 was synthesized by adding, by portions, 90 grams of polyvinyl alcohol (Celvol™ 103, an 98% hydrolyzed polyvinyl acetate having an average molecular weight of about 18,000) to a reaction flask containing 600 grams of DMSO at 60° C., under nitrogen atmosphere and with constant stirring. After complete dissolution, 5 ml of concentrated sulfuric acid were added to the flask. After thirty minutes, 25 grams of butyraldehyde (346.6 mmole, available from Sigma-Aldrich, Canada) were slowly added to the flask and the mixture was stirred at 60° C. for 2 hours. Then, 50 grams of 4-hydroxybenzaldehyde (409 mmole, available from Sigma-Aldrich, Canada) were slowly added to the flask and the mixture was stirred at 60° C. for 4 hours. A solution containing 50 ml of 1-methoxypropanol and 2.8 grams of 5-formyluracil (20 mmole, available from Sigma-Aldrich, Canada) was then slowly added to the reaction mixture that was stirred at 60° C. for another 2 hours. Finally, a solution containing 100 ml of 1-methoxypropanol and 23.7 grams of 2-[2-[2-(4-formylbenzothio)-3-(1,3-dihydro-1,3,3-trimethyl-2H-benz[e]indol-2-ylidene)-ethylidene]-1-cyclohexen-1-yl]-ethenyl]-1,3,3-trimethyl-1H-benz[e]indolium methylbenzenesulfonate (25.5 mmole, available from American Dye Source, Inc.) was slowly added to the flask and the mixture was stirred at 60° C. for 5 hours. The product obtained was precipitated in 10 liters of de-ionized water, filtered and copiously washed with water. It was then dried in air until constant weight.

Figure 6:
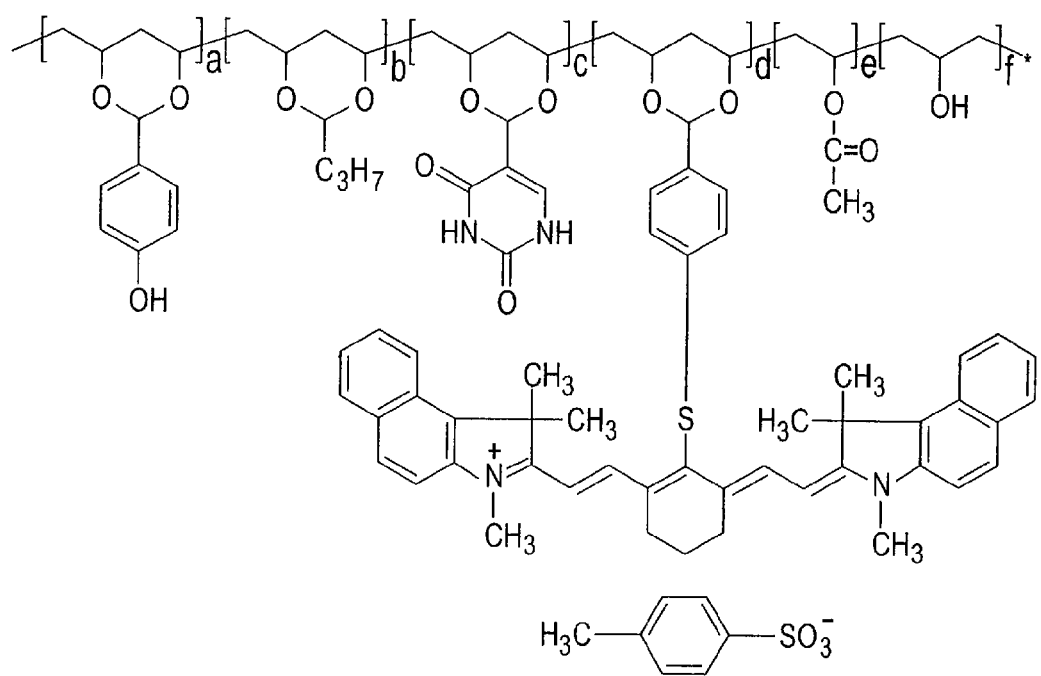
FIG. 6 is the ideal structure of M1-S06 thermally reactive near-infrared absorbing acetal copolymer.

The UV-Vis-NIR spectrum of M1-S06 was recorded in methanol and exhibited a strong absorption peak at 832 nm. The ideal structure of M1-S06 is shown in FIG. 6 wherein a=40.90%, b=34.66%, c=2.00%, d=2.55%, e=2.00% and f=17.85%.

EXAMPLE 7

Copolymer M1-S01 was synthesized by adding, by portions, 90 grams of polyvinyl alcohol (Celvol™ 103, an 98% hydrolyzed polyvinyl acetate having an average molecular weight of about 18,000) to a reaction flask containing 810 grams of dimethylsulfoxide (DMSO) at 60° C., under nitrogen atmosphere and with constant stirring. After complete dissolution, 3 ml of concentrated sulfuric acid, which acts as a catalyst for this reaction, were added to the flask. After thirty minutes, 18.0 grams of butyraldehyde (250.0 mmole, available from Sigma-Aldrich, Canada) were slowly added to the flask and the mixture was stirred at 60° C. for 2 hours. Then, 61 grams of 2-hydroxybenzaldehyde (499.5 mmole, available from Sigma-Aldrich, Canada) were slowly added to the flask and the mixture was stirred at 60° C. for 4 hours. Finally, a solution containing 100 ml of 1-methoxypropanol and 20 grams of 2-[2-[2-(4-formylbenzothio)-3-(1,3-dihydro-1,3,3-trimethyl-2H-benz[e]indol-2-ylidene)-ethylidene]-1-cyclohexen-1-yl]-ethenyl]-1,3,3-trimethyl-1H-benz[e]indolium perchlorate (25.5 mmole, available from American Dye Source, Inc.) was slowly added to the flask. The resulting mixture was stirred at 60° C. for another 4 hours after which the reaction product was precipitated in 10 liters of de-ionized water, filtered and washed copiously with water. It was then dried in air until constant weight.

Figure 7:
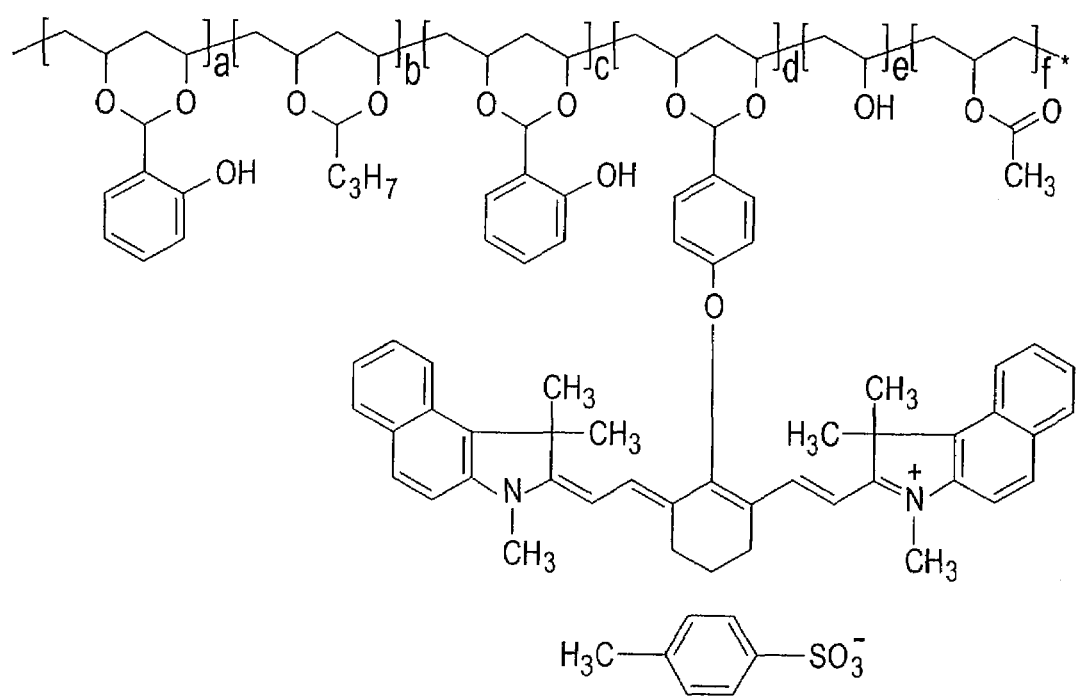
FIG. 7 is the ideal structure of M1-S07 thermally reactive near-infrared absorbing acetal copolymer.

The UV-Vis-NIR spectrum of M1-S07 was recorded in methanol and exhibited a strong absorption peak at 827 nm. The ideal structure of M1-S07 is shown in FIG. 7 wherein a+c=49.90%, b=25.00%, d=2.55%, e=2.00% and f=20.55%.

Water-Soluble (W) Acetal Copolymers

EXAMPLE 8

Water-soluble copolymer M1-W01 was synthesized by adding, by portions, 90 grams of polyvinyl alcohol (Celvol™ 103, an 98% hydrolyzed polyvinyl acetate having an average molecular weight of about 18,000) to a reaction flask containing 600 ml of DMSO at 60° C., under nitrogen atmosphere and with constant stirring. After complete dissolution, 3 ml of concentrated sulfuric acid, which acts as a catalyst for this reaction, were added to the flask. After thirty minutes, 1.5 grams of 4-caboxybenzaldehyde (1.0 mmole, available from Sigma-Aldrich, Canada) were slowly added to the flask and the mixture was stirred at 60° C. for 2 hours. Then, 3.0 grams of 2-[2-[2-(4-formylbenzothio)-3-(1,3-dihydro-1-carboxypropyl-3,3-dimethyl-2H-benz[e]indol-2-ylidene)-ethylidene]-1-cyclohexen-1-yl]-ethenyl]-1-carboxypropyl-3,3-trimethyl-1H-benz[e]indolium 4-methylbenzene-sulfonate (3.5 mmole, available from American Dye Source, Inc.) were slowly added to the reaction mixture that was stirred at 60° C. for another 5 hours. The dark green polymer product obtained was precipitated in acetone/methanol (ratio: 90/10% by volume), filtered and copiously washed with acetone. It was then dried in air until constant weight.

Figure 8:
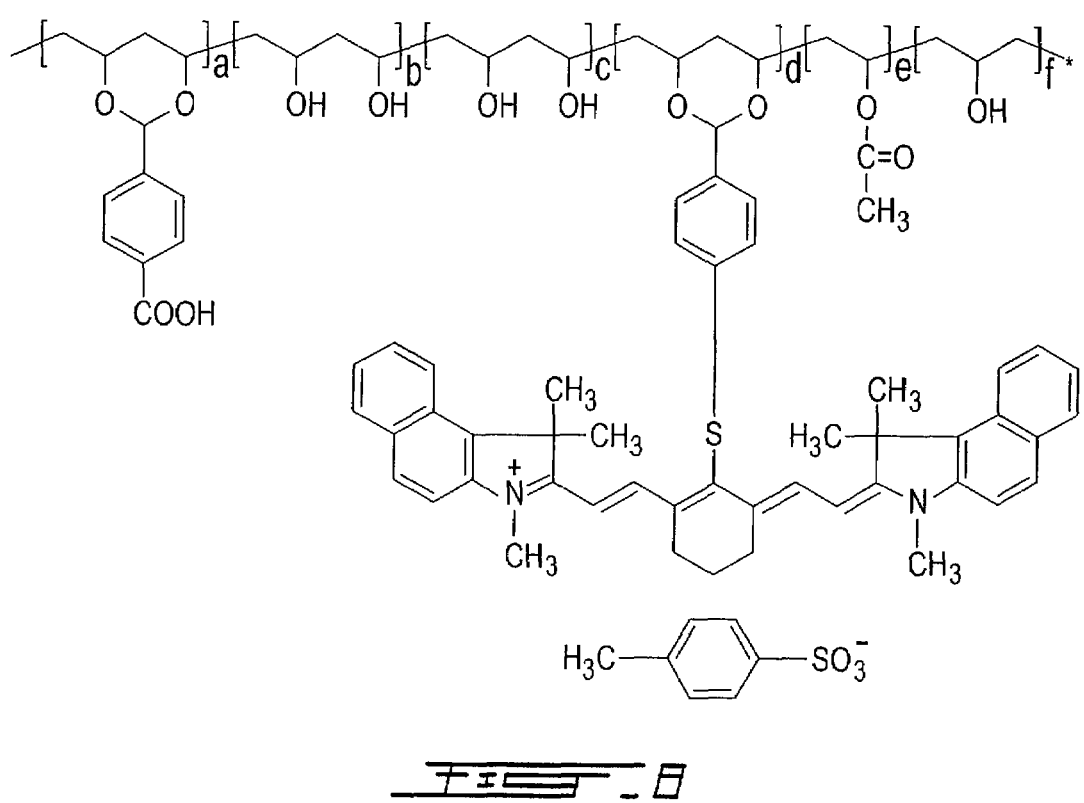
FIG. 8 is the ideal structure of M1-W01 water-soluble thermally reactive near-infrared absorbing acetal copolymer.

M1-W01 is very soluble in water and its UV-Vis-NIR spectrum exhibited strong absorption peaks around 732 and 818 nm. The ideal structure of M1-W01 is shown in FIG. 8 wherein a=1.00%, b+c+f=96.65%, d=0.35%, e=2.00%.

EXAMPLE 9

Water-soluble copolymer M1-W02 was synthesized by adding, by portions, 90 grams of polyvinyl alcohol (Celvol™ 103, an 98% hydrolyzed polyvinyl acetate having an average molecular weight of about 18,000) to a reaction flask containing 600 ml of DMSO at 60° C., under nitrogen atmosphere and with constant stirring. After complete dissolution, 3 ml of concentrated sulfuric acid, which acts as a catalyst for this reaction, were added to the flask. After thirty minutes, 1.22 grams of 4-hydroxybenzaldehyde (10 mmole, available from Sigma-Aldrich, Canada) were slowly added to the flask and the mixture was stirred at 60° C. for 2 hours. Then, 3.0 grams of of 2-[2-[2-(4-formylbenzothio)-3-(1,3-dihydro-1-carboxypropyl-3,3-dimethyl-2H-benz[e]indol-2-ylidene)-ethylidene]-1-cyclohexen-1-yl]-ethenyl]-1-carboxypropyl-3,3-trimethyl-1H-benz[e]indolium 4-methylbenzenesulfonate (3.5 mmole, available from American Dye Source, Inc.) were slowly added into the reaction mixture that was stirred at 60° C. for 5 another hours. The dark green polymer product obtained was precipitated in acetone/methanol (ratio: 90/10% by volume), filtered and copiously washed with acetone. It was then dried in air until constant weight.

Figure 9:
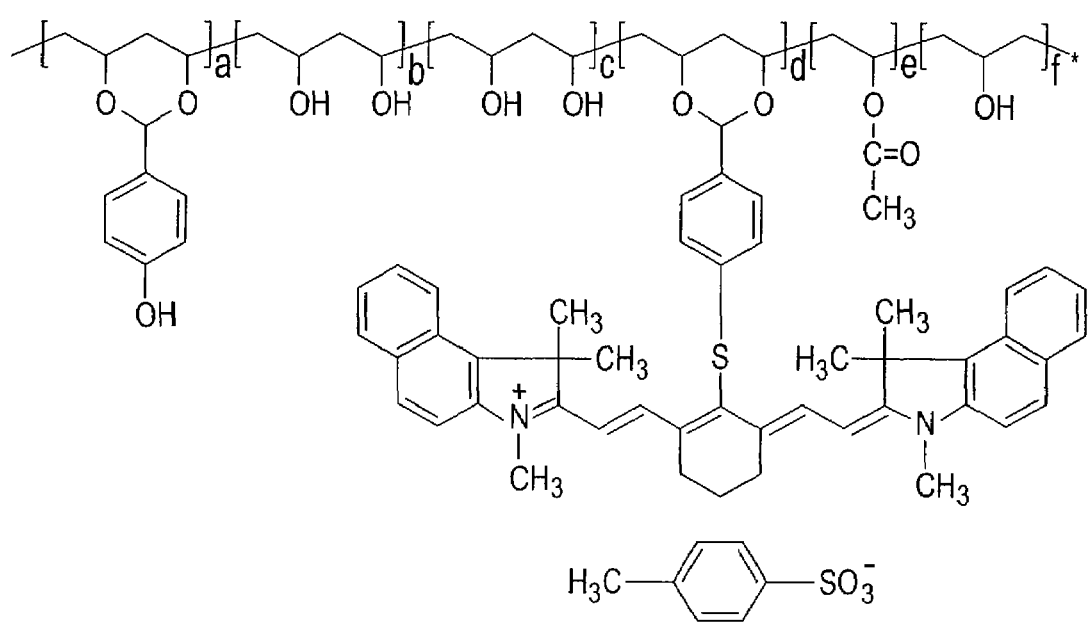
FIG. 9 is the ideal structure of M1-W02 water-soluble thermally reactive near-infrared absorbing acetal copolymer.

The ideal structure of M1-W02 is shown in FIG. 9, wherein a=1.00%, b+c+f=96.65%, d=0.35%, e=2.00%.

Method 2 (M2)—Synthesis Starting with an Acetal Copolymer Containing a Reactive Functional Group Solvent-Soluble Thermally (S) Acetal Copolymers

EXAMPLE 10

Figure 10:
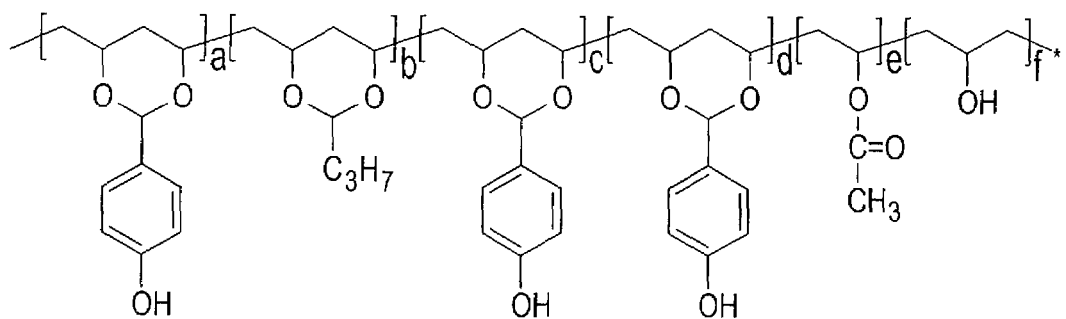
FIG. 10 is the ideal structure of S01 solvent soluble non near-infrared absorbing acetal copolymer precursor.

Copolymer M2-S01 was synthesized by adding, by portions, 90 grams of polyvinyl alcohol (Celvol™ 103, an 98% hydrolyzed polyvinyl acetate having an average molecular weight of about 18,000) to a reaction flask containing 704 grams of DMSO at 60° C., under nitrogen atmosphere and with constant stirring. After complete dissolution, 3 ml of concentrated sulfuric acid, which acts as a catalyst for this reaction, were added to the flask. After thirty minutes, 25 grams of butyraldehyde (346.6 mmole, available from Sigma-Aldrich, Canada) were slowly added to the reaction flask and the mixture was stirred at 60° C. for 2 hours. Then, 60 grams of 4-hydroxybenzaldehyde (491.3 available from Sigma-Aldrich, Canada) were slowly added to the flask and stirring at 60° C. continued for 3 hours. 1.38 grams of 4-mercaptobenzaldehyde (10 mmole, available from American Dye Source, Inc.) were then slowly added into the reaction mixture that was stirred at 60° C. for an additional 5 hours. One half of the reaction mixture was then precipitated in 50 liters of de-ionized water, filtered and washed copiously with water. It was then dried in air until constant weight. The ideal structure of the precursor S01 obtained is shown in FIG. 10 wherein a+c+d=51.3%, b=35.0%, e=2.00% and f=11.7%.

The remaining half of the reaction mixture was neutralized with NaOH. After the neutralization, 0.4 grams of sodium hydride (60% in mineral oil, available from Sigma-Aldrich, Canada) were added to the mixture that was stirred at 60° C. until no further hydrogen bubbles could be observed forming in the flask. 5.0 grams of 2-[2-[2-chloro-3-[2-(1,3-dihydro-1,3,3-trimethyl-2H-benz[e]indol-2-ylidene)-ethylidene]-1-cyclohexen-1-yl]-ethenyl]-1,3,3-trimethyl-1H-benz[e]indolium 4-methylbenzenesulfonate (1.32 mmole, available from American Dye Source, Inc.) were then slowly added to the reaction mixture that was stirred at 60° C. for an additional 5 hours. The dark green product obtained was precipitated in 10 liters of water, filtered and copiously washed with water. The near-infrared absorbing acetal copolymer M2-S01 was then air dried until constant weight.

Figure 11:
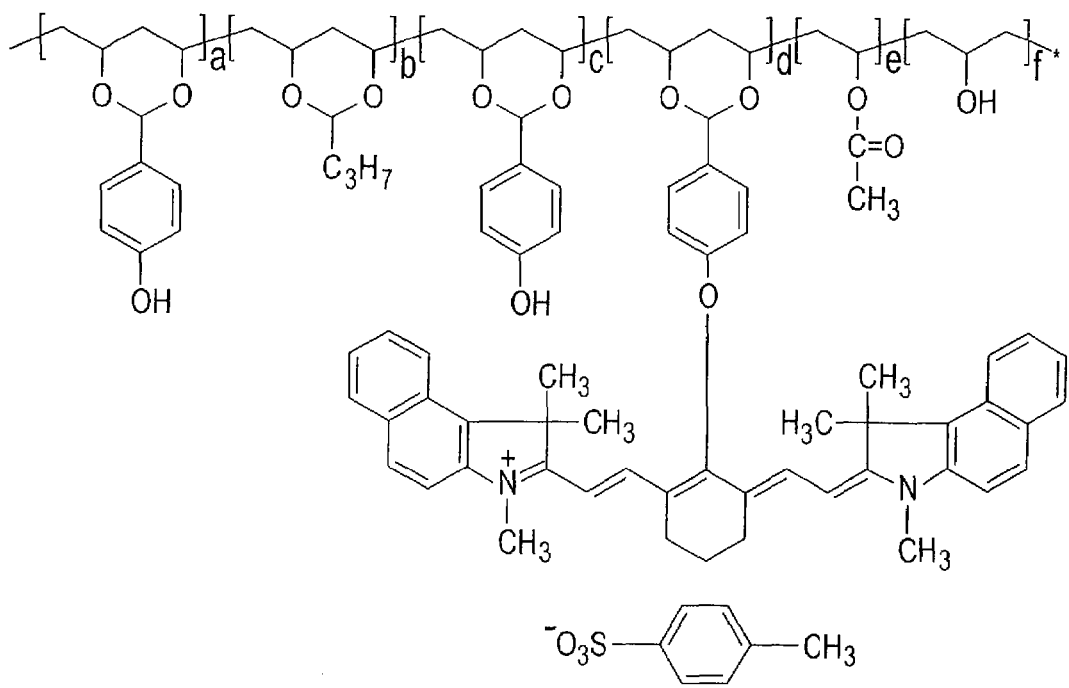
FIG. 11 is the ideal structure of M2-S01 thermally reactive near-infrared absorbing acetal copolymer.

The UV-Vis-NIR spectrum of M2-S01 was recorded in methanol and exhibited a strong near-infrared absorption peak at 802 nm. This peak indicates that the near-infrared absorbing chromophore covalently bonded to the acetal copolymer backbone. The ideal structure of M2-S01 is shown in FIG. 11 wherein a+c=49.82%, b=35.0%, d=1.32%, e=2.00% and f=11.7%.

EXAMPLE 11

Figure 12:
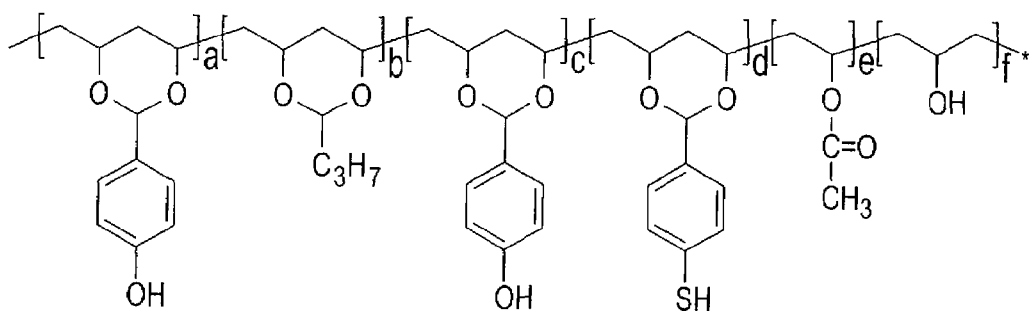
FIG. 12 is the ideal structure of S02 solvent soluble non near-infrared absorbing acetal copolymer.

Copolymer M2-S02 was synthesized by adding, by portions, 90 grams of polyvinyl alcohol (Celvol™ 103, an 98% hydrolyzed polyvinyl acetate having an average molecular weight of about 18,000) to a reaction flask containing 704 grams of DMSO at 60° C., under nitrogen atmosphere and with constant stirring. After complete dissolution, 3 ml of concentrated sulfuric acid, which acts as a catalyst for this reaction, were added to the flask. After thirty minutes, 25 grams of butyraldehyde (346.6 mmole, available from Sigma-Aldrich, Canada) were slowly added to the reaction flask and the mixture was stirred at 60° C. for 2 hours. Then, 60 grams of 4-hydroxybenzaldehyde (491.3 mmole available from Sigma-Aldrich, Canada) were slowly added to the flask and stirring at 60° C. continued for 3 hours. 1.38 grams of 4-Mercaptobenzaldehyde (10 mmole, available from American Dye Source, Inc.) were then slowly added to the reaction that was stirred at 60° C. for an additional 5 hours. One half of the reaction mixture was then precipitated in 5 liters of de-ionized water, filtered and copiously washed with water. It was then dried in air until constant weight. The ideal structure of the precursor SO2 obtained is shown in FIG. 12 wherein a+c=49.13%, b=35.0%, d=1.00%, e=2.00% and f=12.87%.

The pH of the remaining half of the reaction mixture was then brought to 9 using NaOH. 6.84 grams of 2-[2-[2-chloro-3-[2-(1,3-dihydro-1,3,3-trimethyl-2H-benz[e]indol-2-ylidene)-ethylidene]-1-cyclohexen-1-yl]-ethenyl]-1,3,3-tri-methyl-1H-benz[e]indolium perchlorate (10.0 mmole, available from American Dye Source, Inc.) were then slowly added to the reaction mixture and stirring at 60° C. continued for an additional 5 hours. The dark green product obtained was precipitated in 10 liters of water, filtered and copiously washed with water. The thermally reactive near-infrared absorbing acetal copolymer M2-S02 was then air dried until constant weight.

Figure 13:
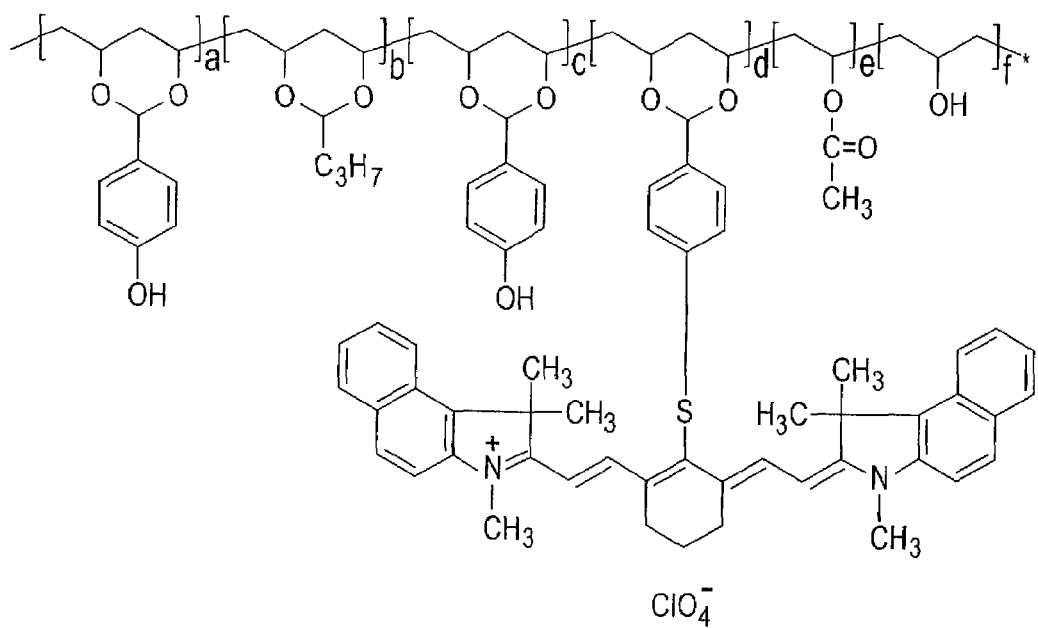
FIG. 13 is the ideal structure of M2-S02 solvent soluble thermally reactive near-infrared absorbing acetal copolymer.

The UV-Vis-NIR spectrum of M2-S02 was recorded in methanol and exhibited a strong near-infrared absorption peak at 832 nm. This peak indicates that the near-infrared absorbing chromophores covalently bonded to the acetal copolymer backbone. The ideal structure of the M2-S02 is shown in FIG. 13 wherein a+c=49.13%, b=35.00%, d=1.00%, e=2.00% and f=12.87%.

Water-Soluble (W) Acetal Copolymers

EXAMPLE 12

Water-soluble copolymer M2-W01 was synthesized by adding 0.2 grams of sodium hydroxide in 2 ml of water to 200 grams of a DMSO solution containing 10% by weight of poly[vinyl alcohol-co-(4-mercaptophenylacetal)] (3.3 mmole of mercapto functional group, available from American Dye Source, Inc.). After stirring for two hours at room temperature, 2.5 grams of 2-[2-[2-chloro-3-[2-(1,3-dihydro-1,3,3-trimethyl-2H-benz[e]indol-2-ylidene)-ethylidene]-1-cyclohexen-1-yl]ethenyl]-1,3,3-trimethyl-1H-benz[e]indo-lium 4-methylbenzenesulfonate (ADS830AT, available from American Dye Source, Inc.) were added while stirring. After 5 hours of continuous stirring, the product obtained was precipitated in an acetone/water mixture (95%-5%), filtered, washed with the acetone/water mixture and dried in air until constant weight. The dark green polymeric product M2-W01 obtained was very soluble in water.

Figure 14:
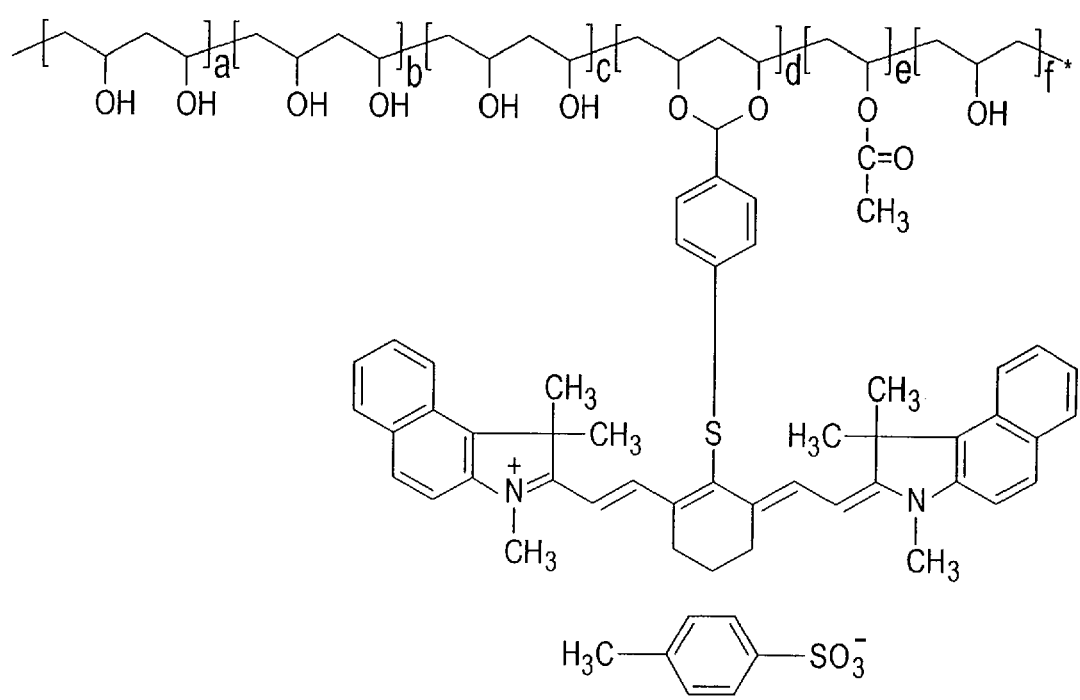
FIG. 14 is the ideal structure of M2-W01 water-soluble thermally reactive near-infrared absorbing acetal copolymer.

The UV-Vis-NIR spectrum of M2-W01 was recorded in water and exhibited strong peaks at 727 and 830 nm. The ideal structure of M2-W01 is shown in FIG. 14 with a+b+c+f=97.67% and d=0.33%.

EXAMPLE 13

Water-soluble copolymer M2-W02 was synthesized by adding 0.2 grams of sodium hydride (60% in mineral oil, available from Sigma-Aldrich, Canada) to 200 grams of a DMSO solution containing 10.0% by weight of poly[vinyl alcohol-co-(4-hydroxyphenylacetal)] (3.3 mmole of hydroxyphenyl functional group per gram of the copolymer, available from American Dye Source, Inc.). After stirring one hour at 60° C., 2 grams of 2-[2-[2-chloro-3-[2-(1,3-dihydro-1,3,3-trimethyl-2H-benz[e]indol-2-ylidene)-ethylidene]-1-cyclohexen-1-yl]ethenyl]-1,3,3-trimethyl-1H-benz[e]indolium 4-methylbenzenesulfonate (available from American Dye Source, Inc.) were added to the flask while stirring. After 5 hours of continuous stirring, the product obtained was precipitated in an acetone/methanol mixture (95-5%), filtered, washed with the acetone/methanol mixture until the washing solution was colorless and dried in air until constant weight. The dark green polymeric product obtained was very soluble in water.

Figure 15:
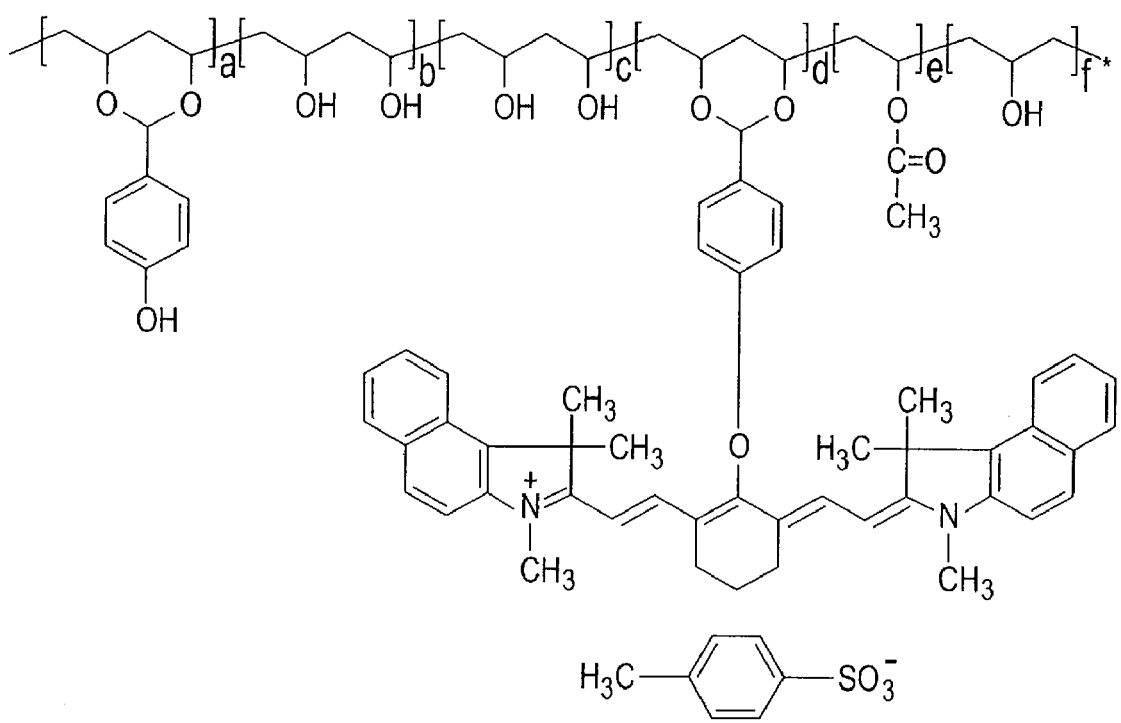
FIG. 15 is the ideal structure of M2-W02 water-soluble thermally reactive near-infrared absorbing acetal copolymer.

The UV-Vis-NIR spectrum of M2-W02 exhibited two absorption peaks at 724 and 803 nm, which indicated that the near-infrared chromophores covalently bonded to the polymer backbone. The ideal structure of M2-W02 is shown in FIG. 15 wherein a+b+c+f=97.67% and d=0.33%.

Coatings Comprising the Acetal Copolymer of the Invention

The coatings were applied on aluminum substrates using a spin coater at 70° C. The aluminum substrate used was electro-grained and anodized with hydrochloric acid and sulfuric acid, respectively. It was then treated with an aqueous solution of NaF/NaH2PO4 or with polyvinyl phosphoric acid at 80° C. to improve its hydrophilicity. The surface roughness (Ra) and oxide weight of the employed aluminum substrate were around 0.5 and 4.2 $g/m^2$, respectively.

The different chemical products used in printing plate coatings described in the following table:

| | Glossary |
|---|---|
| Thermolak ™ 7525 | Novolak-ester resin |
| | (American Dye Source, Inc., Baie d'Urfe, Quebec, Canada) |
| ADS830AT | Infrared absorption dye ($\lambda_{max}$ = 830 nm) |
| | (American Dye Source, Inc., Baie d'Urfe, Quebec, Canada) |
| ADS775MI | Infrared absorption dye ($\lambda_{max}$ = 800 nm) |
| | (American Dye Source, Inc., Baie d'Urfe, Quebec, Canada) |
| Bacote 20 ™ | Ammonium zirconyl carbonate in water solution |
| | (Magnesium Elektron Inc., Flemington, New Jersey) |
| Basic violet 3 | Crystal violet Visible dye |
| | (Spectra Colors, Kearny, New Jersey, USA) |
| Silikophene ™ P50/X | Siloxane polymer in xylene (50% by weight) |
| | (Degussa, Parsippany, New Jersey, USA) |
| Dowanol ™ PM | 1-Methoxypropanol |
| | (Canada Color Corporation, St. Laurent, Quebec, Canada) |
| ADS500SF | Ionic and non-ionic surfactant mixture |
| | (American Dye Source, Inc., Baie d'Urfe, Quebec, Canada) |

The alkaline developer used in this invention is available from American Dye Source, Inc. and has the following composition:

| Components | Parts |
|---|---|
| De-mineralized water | 85.00 |
| Sodium metasilicate pentahydrate | 12.50 |
| ADS500SF | 2.50 |

Preparation of Single-Layer Positive Working Lithographic Printing Plates

To test the one-layer coatings, the printing plates made with the following compositions were imaged on a Creo Trendsetter™ 3244 Image Setter with an energy density of 160 mJ/cm². The GATF target was used as a testing image and the imaged plates were developed by hand with the alkaline developer immediately after imaging.

COMPARATIVE EXAMPLES

Coatings not Containing the Copolymer of the Invention

EXAMPLE 14

A coating solution with the following composition was spin-coated on an anodized aluminum substrate at 70° C. before the plate was dried at 130° C. for 3 minutes and stored at room conditions for 7 days. The obtained coating weight was around 1.5 g/m². The image area was partially washed out by the developer.

| Composition | Amounts |
| --- | --- |
| Thermolak ™ 7525 | 90.0 parts |
| ADS830AT | 1.5 parts |
| ADS775MI | 0.5 parts |
| Basic Violet 3 | 2.0 parts |
| Silikophene ™ P50/X | 6.0 parts |
| Dowanol ™ PM | 1000 parts |

EXAMPLE 15

The printing plate was prepared in the same way as the plate described in Example 13, but it was heat treated at 55° C. under an atmosphere containing 25% relative humidity in a convection oven for 3 days before being stored at room conditions for 4 days. High quality images were obtained with 1 to 99% dots and with the 1 and 2 pixels elements.

EXAMPLE 16

A coating solution with the following composition was spin-coated on an anodized aluminum substrate at 70° C. The plate was dried at 130° C. for 2 minutes and then stored at room conditions for 7 days. The obtained coating weight was around 1.5 g/m². The image area was partially washed out by the developer.

| Composition | Amounts |
| --- | --- |
| Thermolak ™ 7525 | 80.0 parts |
| S01 - Example 10 | 10.0 parts |
| ADS830AT | 1.5 parts |
| ADS775MI | 0.5 parts |
| Basic Violet 3 | 2.0 parts |
| Silikophene ™ P50/X | 6.0 parts |
| Dowanol ™ PM | 1000 parts |

EXAMPLE 17

The printing plate was prepared in the same way as the plate described in Example 15, but was heat treated at 55° C. under an atmosphere containing 25% relative humidity in a convection oven for 3 days before being stored at room conditions for 4 days. High quality images were obtained with 1 to 99% dots and with the 1 and 2 pixels elements.

Together Examples 14, 15, 16 and 17 indicate that plates that do not contain the novel near-infrared absorbing acetal copolymers of this invention need post-production heat treatment in order to produce high-quality images.

WORKING EXAMPLES

Coatings Containing the Copolymer of the Invention

EXAMPLE 18

A coating solution with the following composition was spin-coated on an anodized aluminum substrate at 70° C. The plate was dried at 130° C. for 2 minutes before being stored at room conditions for 7 days. The coating weight obtained was around 1.5 g/m². High quality images were obtained with 1 to 99% dots and with the 1 and 2 pixel elements.

| Composition | Amounts |
| --- | --- |
| Thermolak ™ 7525 | 80.0 parts |
| M2-S01 - Example 10 | 13.0 parts |
| Basic Violet 3 | 2.0 parts |
| Silikophene ™ P50/X | 6.0 parts |
| Methanol | 200 parts |
| Dowanol ™ PM | 800 parts |

EXAMPLE 19

A coating solution with the following composition was spin coated on anodized aluminum substrate at 70° C. The coating weight obtained was around 1.5 g/m². The plate was then dried at 130° C. for 2 minutes than store at room conditions for 7 days. High quality images were obtained with 1 to 99% dots and with the 1 and 2 pixel elements.

| Composition | Amounts |
| --- | --- |
| Thermolak ™ 7525 | 80.0 parts |
| M1-S01 - Example 1 | 14.0 parts |
| Silikophene ™ P50/X | 6.0 parts |
| Methanol | 200 parts |
| Dowanol ™ PM | 800 parts |

EXAMPLE 20

A coating solution with the following composition was spin-coated on an anodized aluminum substrate at 70° C. The plate was dried at 130° C. for 2 minutes before being stores at room conditions for 7 days. The coating weight obtained was around 1.5 g/m². High quality image were obtained with 1 to 99% dots and with the 1 and 2 pixels elements.

| Composition | Amounts |
| --- | --- |
| Thermolak ™ 7525 | 80.0 parts |
| M1-S04 - Example 4 | 14.0 parts |
| Silikophene ™ P50/X | 6.0 parts |

| Composition | Amounts |
|---|---|
| Methanol | 200 parts |
| Dowanol ™ PM | 800 parts |

EXAMPLE 21

A coating solution with the following composition was spin-coated on an anodized aluminum substrate at 70° C. The plate was then dried at 130° C. for 2 minutes than store at room conditions for 7 days. The coating weight obtained was around 1.5 g/m². High quality images were obtained with 1 to 99% dots and with the 1 and 2 pixels elements

| Composition | Amounts |
|---|---|
| Thermolak ™ 7525 | 80.0 parts |
| M1-S06 - Example 6 | 12.0 parts |
| Basic violet 3 | 2.0 parts |
| Silikophene ™ P50/X | 6.0 parts |
| Methanol | 200 parts |
| Dowanol ™ PM | 800 parts |

EXAMPLE 22

A coating solution with the following composition was spin-coated on an anodized aluminum substrate at 70° C. The plate was then dried at 130° C. for 2 minutes than store at room conditions for 7 days. The coating weight obtained was around 1.5 g/m². High quality images were obtained with 1 to 99% dots and with the 1 and 2 pixels elements.

Examples 18 to 22 clearly indicate that plates containing the novel near-infrared absorbing acetal copolymers of this invention do not need any post-production heat treatment to produce high quality images.

| Composition | Amounts |
|---|---|
| Thermolak ™ 7525 | 29.0 parts |
| M1-S07 - Example 7 | 62.0 parts |
| Basic violet 3 | 3.0 parts |
| Silikophene ™ P50/X | 6.0 parts |
| Methanol | 200 parts |
| Dowanol ™ PM | 800 parts |

Preparation of Two-Layers Positive Working Lithographic Printing Plates

To test the two-layers coatings, the printing plates made with these compositions were imaged on a Creo Trendsetter™ 3244 Image Setter with an energy density of 140 mJ/cm2. The GATF target was used as a testing image and the imaged plates were developed by hand with the alkaline developer immediately after imaging.

EXAMPLE 23

For the bottom layer, a coating solution with the following composition was spin-coated on an anodized aluminum substrate at 70° C. The plate was dried at 130° C. for 5 minutes. The coating weight obtained was around 0.3 g/m².

| Composition | Amounts |
|---|---|
| M2-W02 - Example 13 | 6.5 parts |
| Bacote 20 ™ | 2.4 parts |
| Triton ™ X | 0.1 parts |
| Water | 91 parts |

For the top layer, a coating solution with the following composition was spin-coated at 70° C. on an anodized aluminum substrate previously coated with the bottom layer. The plate was then at 130° C. for 2 minutes before being stored at room conditions for 7 days. The coating weight obtained was around 1.5 g/m².

| Composition | Amounts |
|---|---|
| Thermolak ™ 7525 | 80.0 parts |
| M1-S06 - Example 6 | 12.0 parts |
| Basic violet 3 | 2.0 parts |
| Dowanol ™ PM | 200 parts |
| Acetone | 800 parts |

High quality image were obtained with 1 to 99% dots and with the 1 and 2 pixels elements.

EXAMPLE 24

The bottom layer was prepared from a coating solution with the following composition. It was spin coated on anodized aluminum substrate at 70° C. The coating weight is around 0.3 g/m². The plate was then dried at 130° C. for 5 minutes.

| Composition | Amounts |
|---|---|
| M2-W01 - Example 12 | 6.5 parts |
| Bacote 20 ™ | 2.4 parts |
| Triton ™ X | 0.1 parts |
| Water | 91 parts |

For the top layer, a coating solution with the following composition was spin-coated at 70° C. on an anodized aluminum substrate previously coated with the bottom layer. The plate was then at 130° C. for 2 minutes before being stored at room conditions for 7 days. The coating weight obtained was around 1.5 g/m². High quality images were obtained with 1 to 99% dots and with the 1 and 2 pixels elements.

| Composition | Amounts |
|---|---|
| Thermolak ™ 7525 | 80.0 parts |
| M1-S04 - Example 4 | 14.0 parts |
| Methanol | 200 parts |
| Acetone | 800 parts |

Both examples 23 and 24 clearly indicate that two-layers plates containing the novel near-infrared absorbing acetal copolymers of this invention do not need any post-production heat treatment or any image-protecting agents. It is also interesting to note that these plates could be imaged at even lower energy density than the single-layer lithographic printing plates containing the new acetal copolymers.

Although the present invention has been described hereinabove by way of specific embodiments thereof, it can be modified, without departing from the spirit and nature of the subject invention as defined in the appended claims.

What is claimed is:

1. An acetal copolymer having attached thereto a radiation-absorbing segment having at least one strong absorption peak between 700 and 1100 nm.

2. The copolymer of claim 1 having the following general structure:

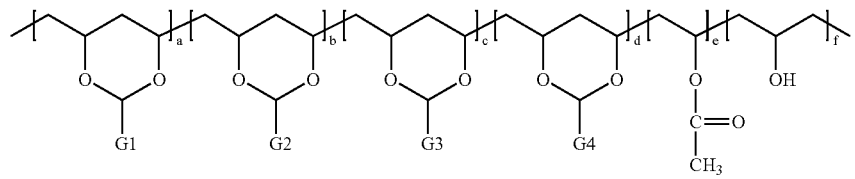

wherein:
G1 represents a processing segment that provides solubility in aqueous solutions having pH between 2.0 and 14.0;
G2 represents a processing segment that provides film-forming properties and solubility in an organic solvent;
G3 represents a thermal reactive segment that undergoes chemical or physical changes upon exposure to near-infrared radiation;
G4 represents a radiation-absorbing segment having one or more strong absorption peak between 700 and 1100 nm;
a, b, c, d, e, and f may vary from 0.02 to 0.98; and
any of

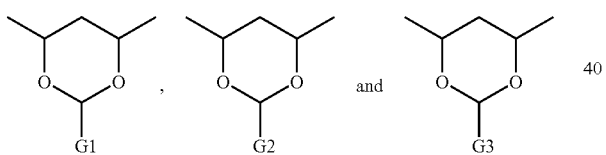

may independently be replaced by

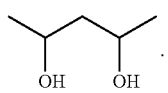

3. The copolymer of claim 2 having a molecular weight greater than about 5,000 g/mol.

4. The copolymer of claim 2 wherein said organic solvent is selected from the group consisting of alcohols, ketone and esters.

5. The copolymer of claim 2 wherein G4 exhibits one or more strong absorption peak between 400 and 700 nm.

6. The copolymer of claim 2 comprising different G4 segments.

7. The copolymer of claim 2 wherein G1 is an alkyl or aryl compound containing a functional group selected from the group consiting of hydroxy, carboxylic acid, sulfonic acid, phosphoric acid, dialkylamino, trialkylammonium salts, ethylene oxide, and propylene oxide.

8. The copolymer of claim 2 wherein G1 is selected from the group consisting of:

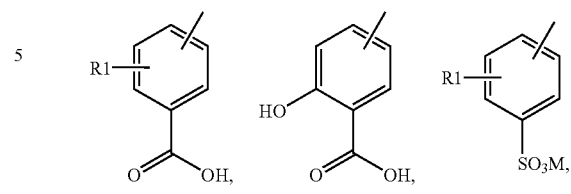

-continued

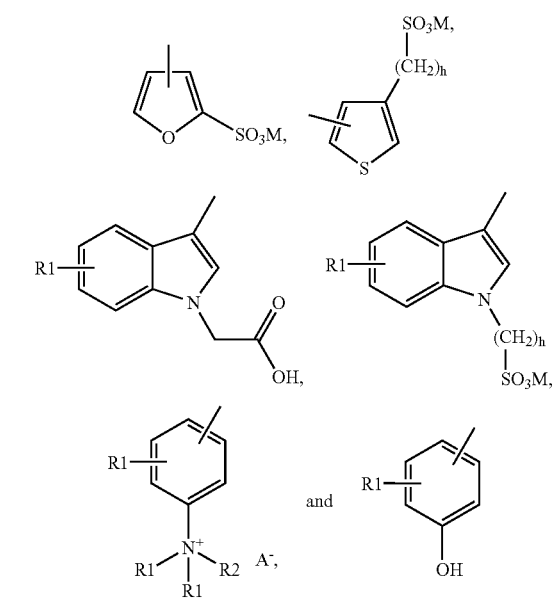

wherein:
R1 is H, C1-C8 alkyl, alkoxy or halide;
R2 is C1-C8 alkyl or alkoxy;
M is hydrogen or sodium; and
A is halide.

9. The copolymer of claim 2 wherein G2 is a C1-C10 alkyl or a C1-C10 alkyl substituted aryl.

10. The copolymer of claim 2 wherein G3 is an alkyl or aryl compound containing a functional group which can participate in the formation of a hydrogen or an ionic bond.

11. The copolymer of claim 10 wherein said functional group is selected from the group consisting of OH, —SH, —CONHR, —NH2, —NHR, —NH— and CO—NHR, wherein R is hydrogen, C1-C10 alkyl or C1-C10 alkyl substituted aryl groups.

12. The copolymer of claim 2 wherein G3 is selected from the group consisting of:

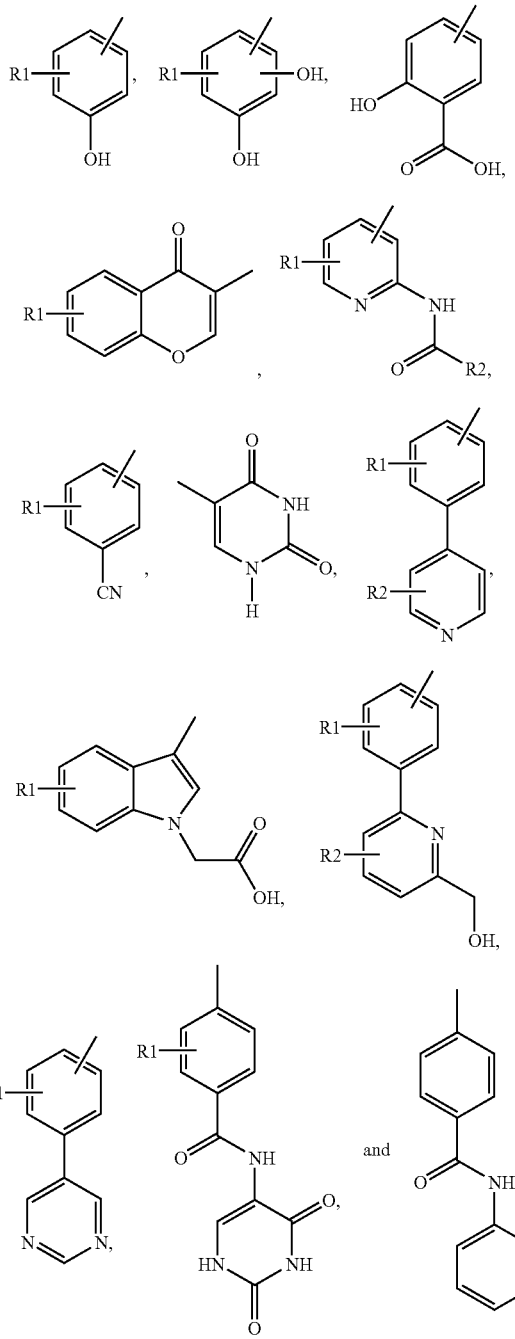

wherein:
R1 is H, C1-C8 alkyl, C1-C8 alkoxy or halide;
R2 is C1-C8 alkyl or C1-C8 alkoxy.

13. The copolymer of claim 2 wherein G3 contains a functional group that can participate in the formation of a covalent bond.

14. The copolymer of claim 13 wherein said functional group is selected from the group consisting of acrylate, methacrylate and vinyl ether.

15. The copolymer of claim 2 wherein G4 has the following general structure:

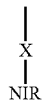

wherein:
NIR is a near-infrared absorbing chromophore having one or more strong absorption peak between 700 and 1100 nm;
X is a spacer group linking said near-infrared absorbing chromophore to said acetal copolymer backbone.

16. The copolymer of claim 15 wherein said near infrared absorbing chromophore has one or more absorption peak between 400 and 700 nm.

17. The copolymer of claim 15 wherein said X is selected from the group consisting of:

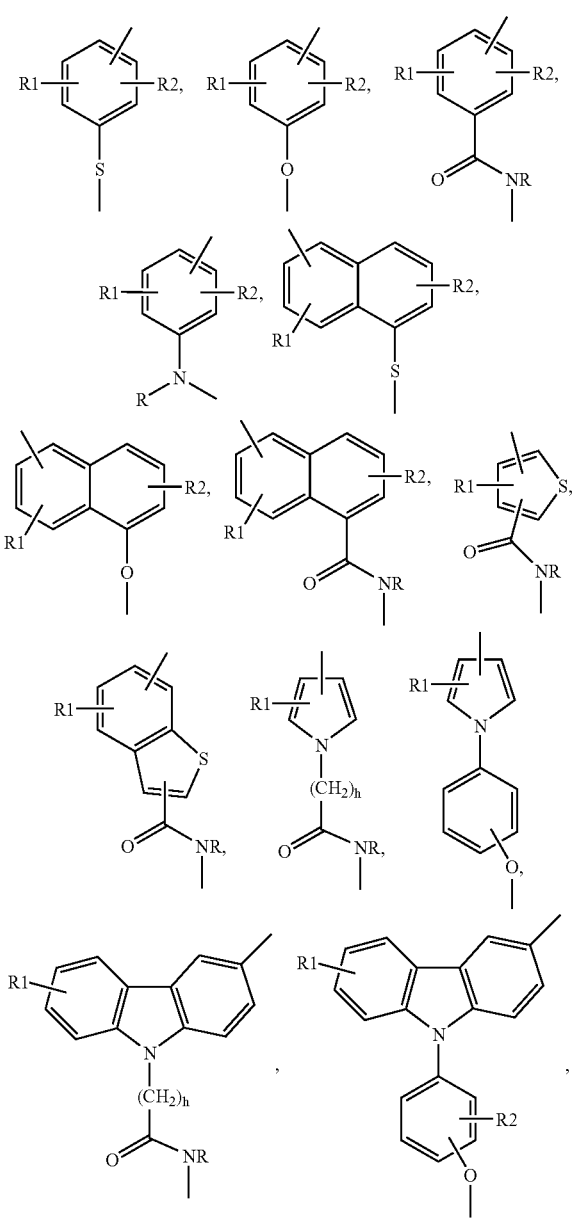

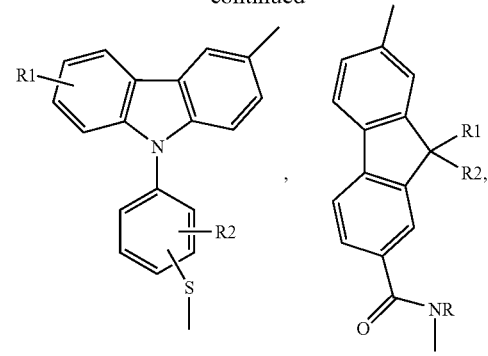

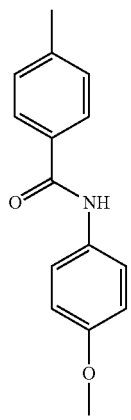

wherein:
R is C1-C8 alkyl, C1-C8 alkyloxy or aryl;
R1 and R2 are independently selected from H, C1-C8 alkyl, C1-C8 alkoxy or halide.

18. The copolymer of claim 15 wherein said near-infrared absorbing chromophore is a near-infrared absorbing organic compound containing one or more cyanine or arylimine functional groups.

19. The copolymer of claim 15 wherein said near-infrared absorbing chromophore is selected from the group consisting of:

wherein:
D1 and D2 independently represent —O—, —S—, —Se—, —CH═CH—, or —C(CH3)2—;
R3 is hydrogen, C1-C8 alkyl and C1-C8 alkoxy;
R4 is C1-C8 alkyl chain, C1-C8 alkyl chain terminating with hydroxy and carboxylic acid, and ethylene oxide chain
R5 represents hydrogen or alkyl groups;
R6 and R7 independently represent alkyl, aryl alkyl, hydroxy alkyl, amino alkyl, carboxy alkyl and sulfo alkyl groups;

Z1 and Z2 independently represent sufficient atoms to form one or more fused substituted or unsubstituted aromatic rings;

h may vary from 2 to 8;

n represents 0 or 1;

M represents H or a cationic counter ion; and

A1 is an anionic counter ion.

20. The copolymer of claim 19 wherein said fused substituted or unsubstituted aromatic ring is phenyl or naphtyl.

21. The copolymer of claim 19 wherein M represents a cationic counter ion selected from the group consisting of Na, K, and tetraalkylammonium.

22. The copolymer of claim 19 wherein M represents a cationic counter ion exhibiting exhibits one or more strong absorption peaks between 400 and 700 nm.

23. The copolymer of claim 22 wherein said cationic counter ion is a cationic portion of a basic dye selected from the group consisting of:

Basic blue 3,7,11,26;

Basic red 9, 29;

Basic yellow 11; and

Basic violet 3, 7,14.

24. The copolymer of claim 19 wherein M has one or more strong absorption peak between 700 and 980 nm and represents:

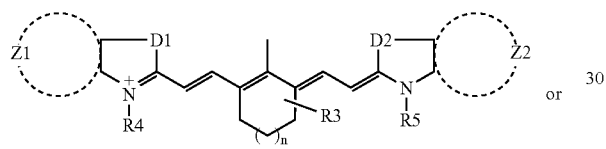

or

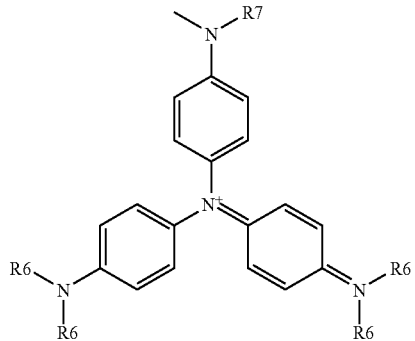

wherein D1, D2, R3, R4, R5, R6, R7, Z1, Z2, and n are as defined in claim 15.

25. The copolymer of claim 19 wherein A1 is selected from the group consisting of bromide, chloride, iodide, tosylate, triflate, trifluoromethane carbonate, dodecyl benzosylfonate, tetraphehylborate, alkyl-triphenylborate and tetrafluoroborate.

26. The copolymer of claim 19 wherein A1 exhibits one or more strong absorption peak between 400 and 700 nm.

27. The copolymer of claim 26 wherein A1 is the anionic portion of an acid dye selected from the group consisting of:

Acid blue 1,7,25,29,40,41,45,80,83,92,93,113,120,129, and 161;

Acid green 25, 27, and 41;

Acid orange 8, 51, and 63;

Acid red 4, 40, 88, 103, 114, 151, and 183; and

Acid violet 5, 7, and 17.

28. The copolymer of claim 19 wherein A1 has one or more strong absorption peak between 400 and 700 nm and is an anionic portion of a cyanine dye similar to the NIR Chromophores represented by the formulas:

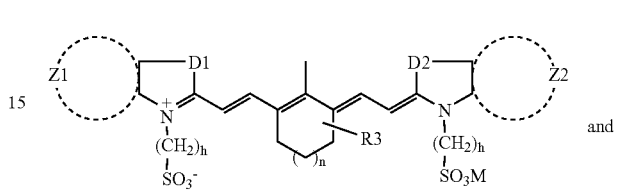

and

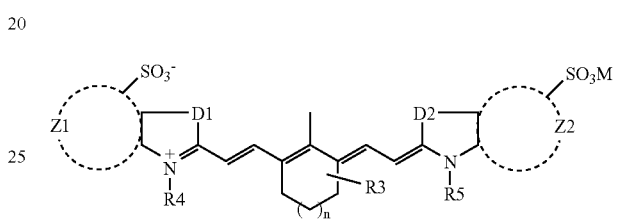

wherein D1, D2, Z1, Z2, R3, R4, R5, M, h and n are as defined in claims 19 to 24.

29. The copolymer of claim 19, wherein A1 is

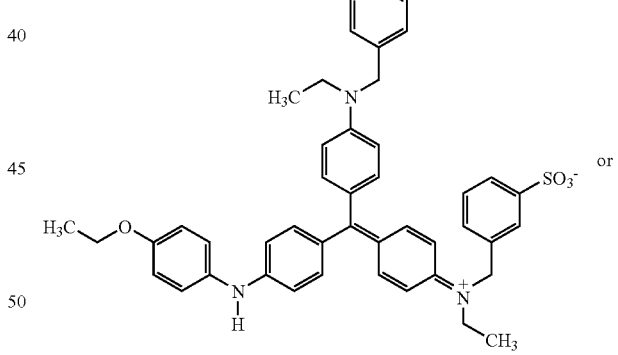

or

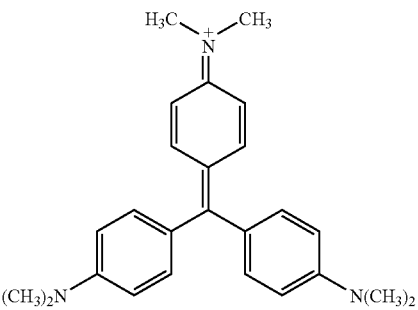

30. The copolymer of claim 1 selected from the group consisting of:
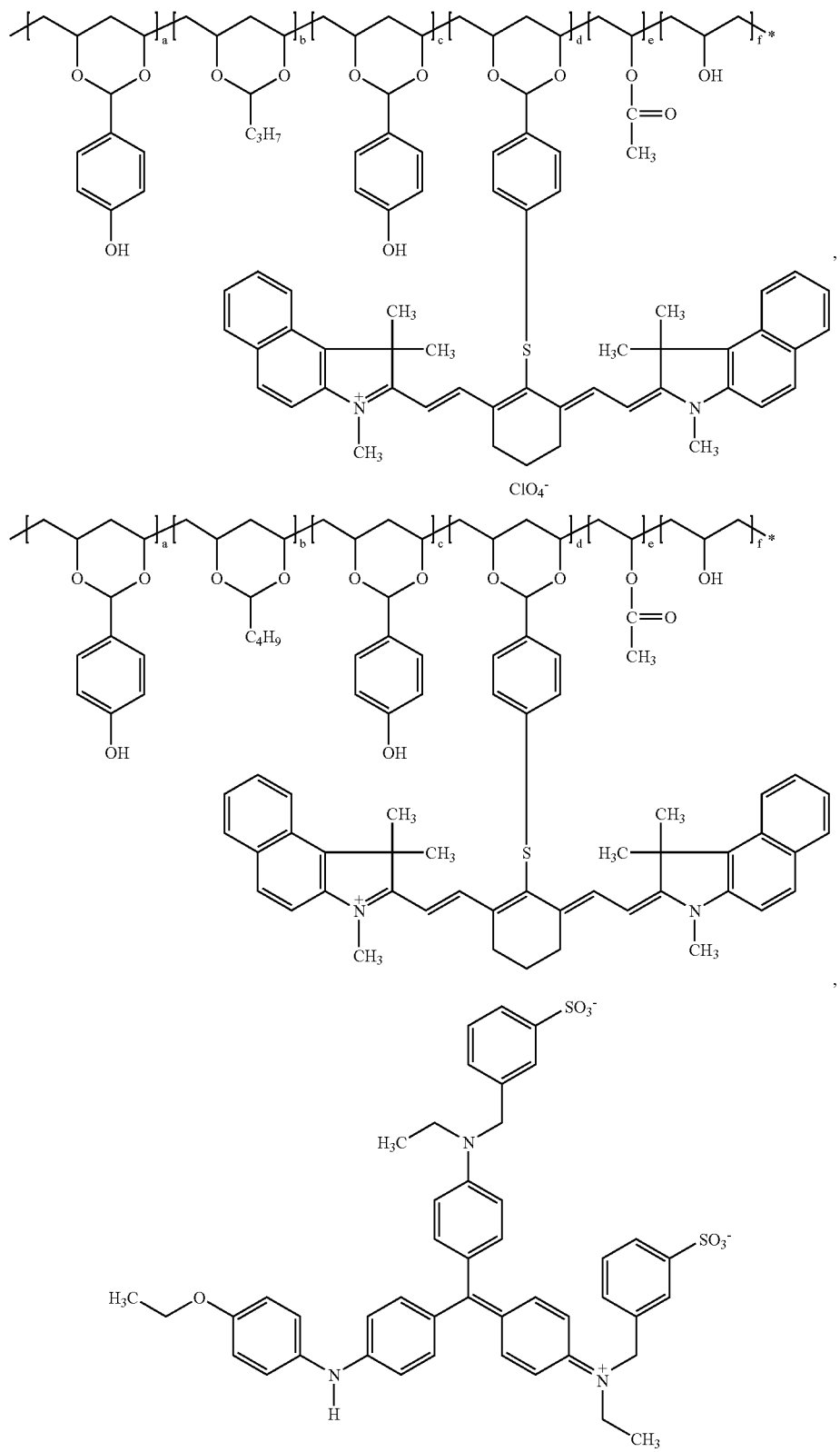

-continued
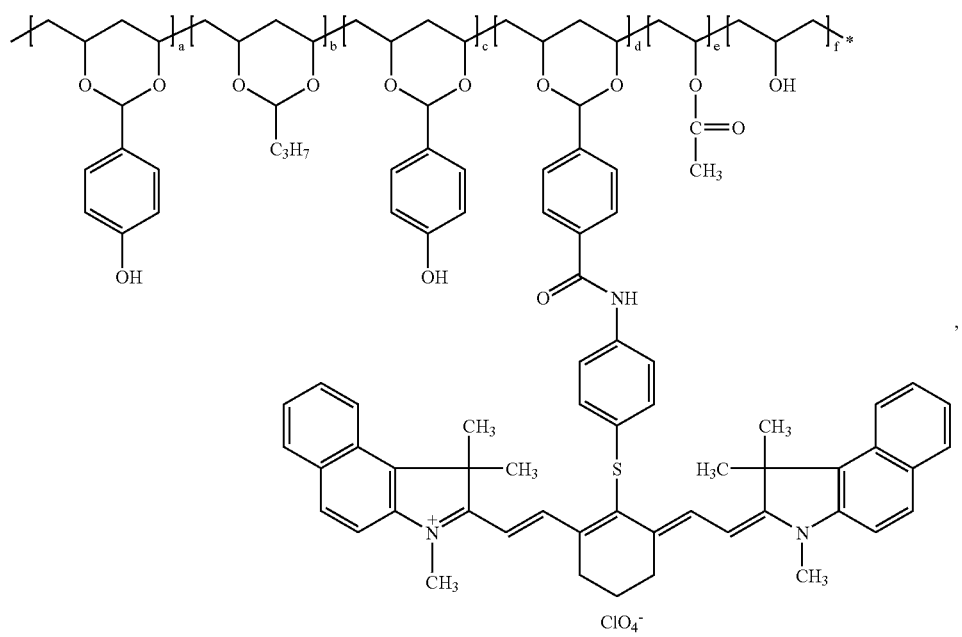
,
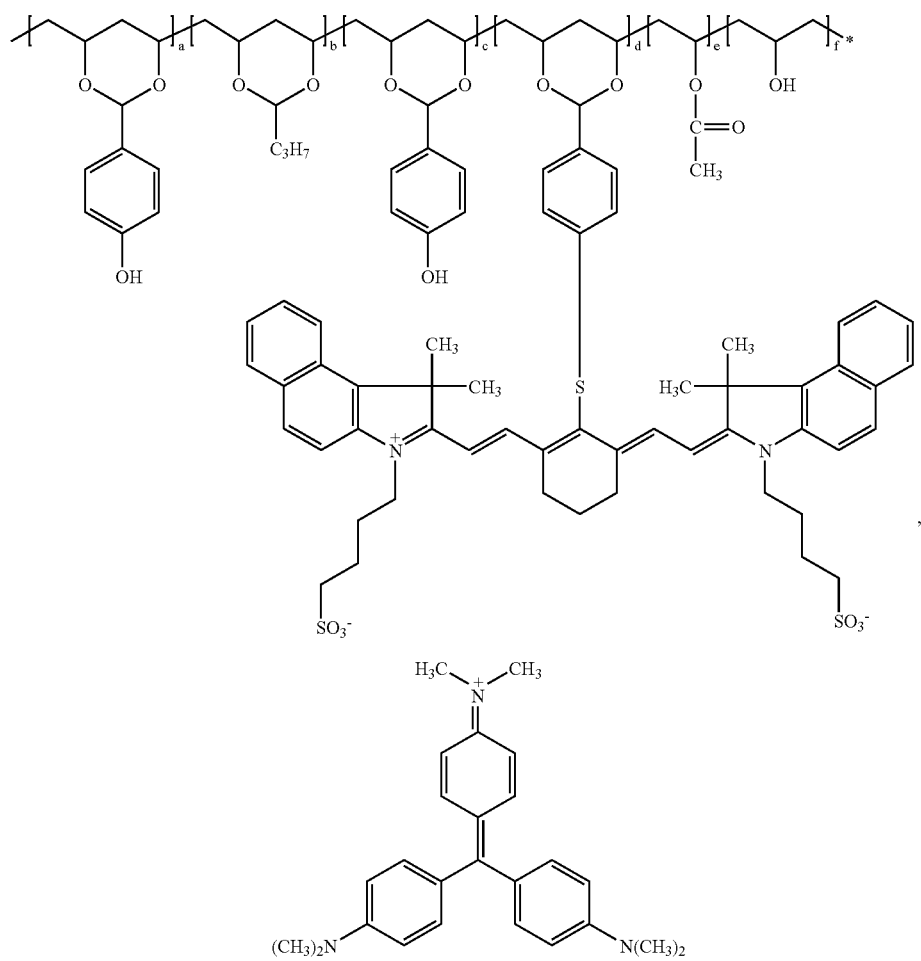

-continued
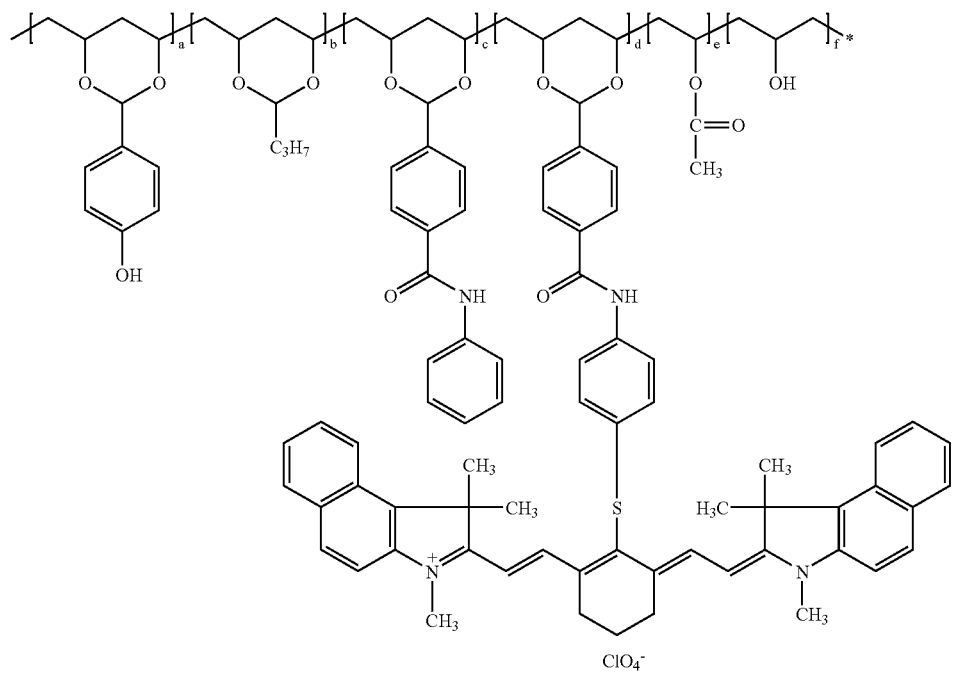
,
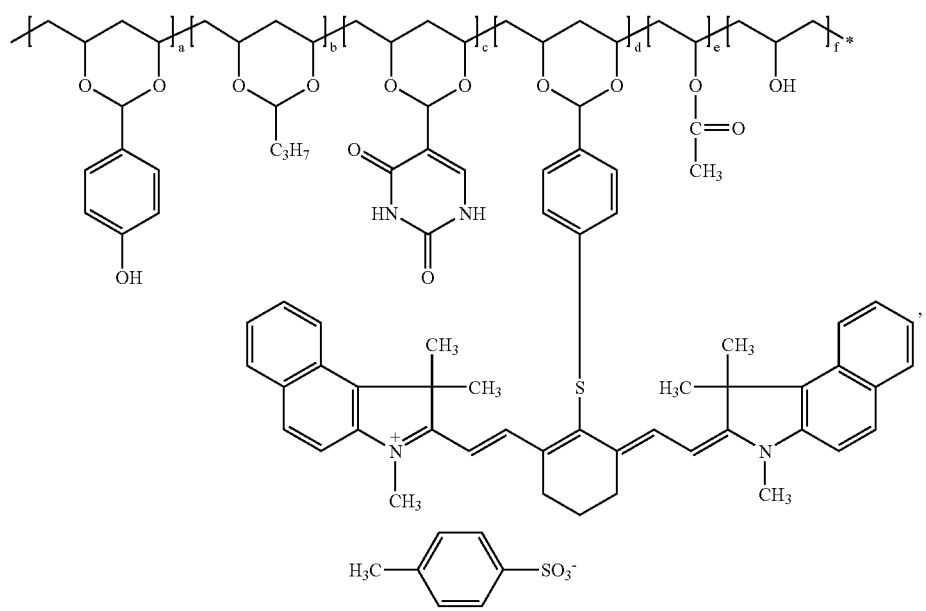
,

-continued
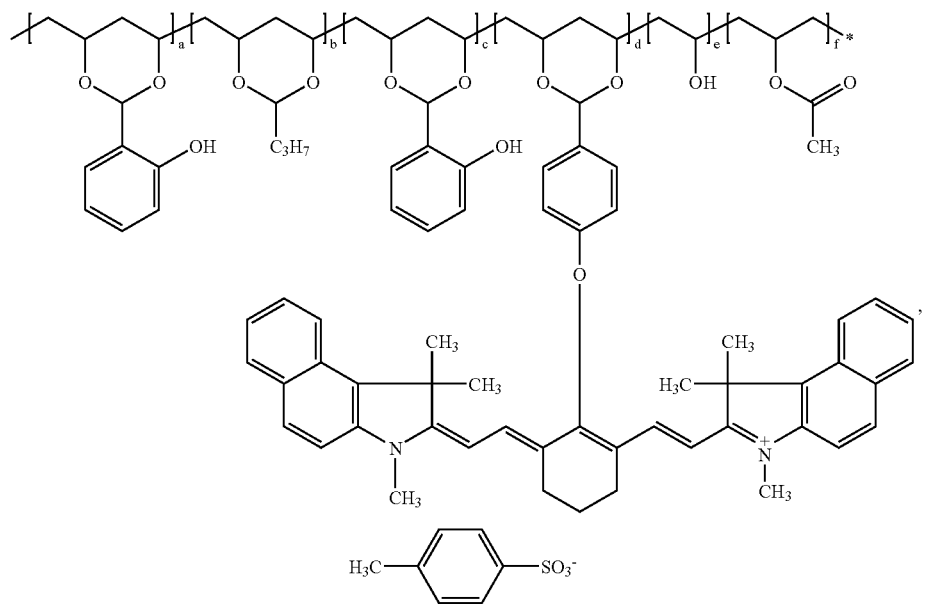
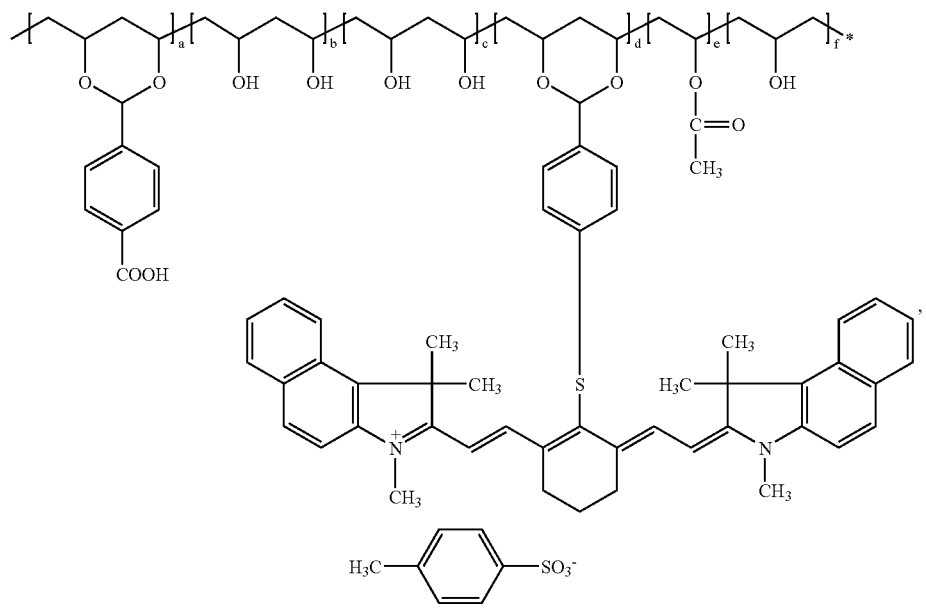

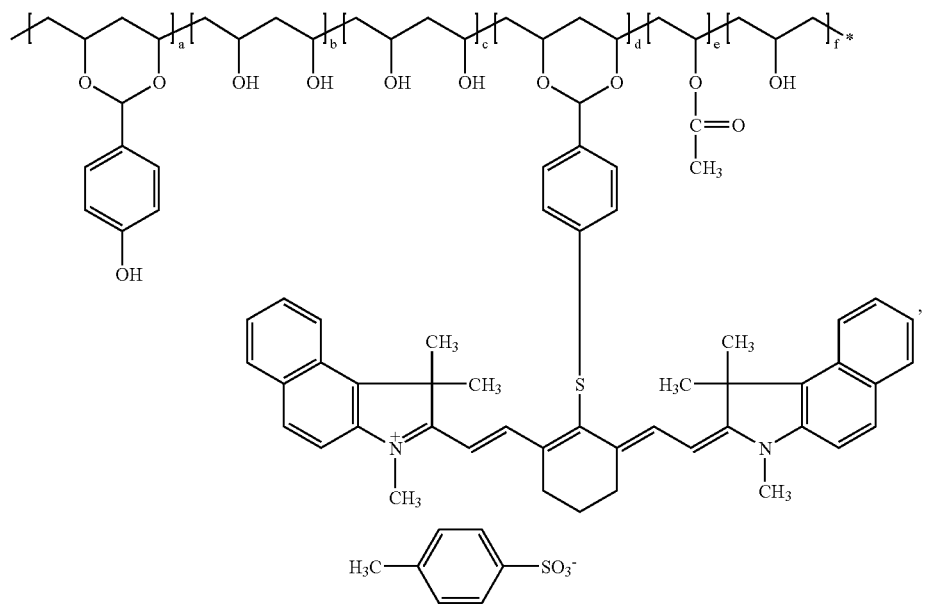
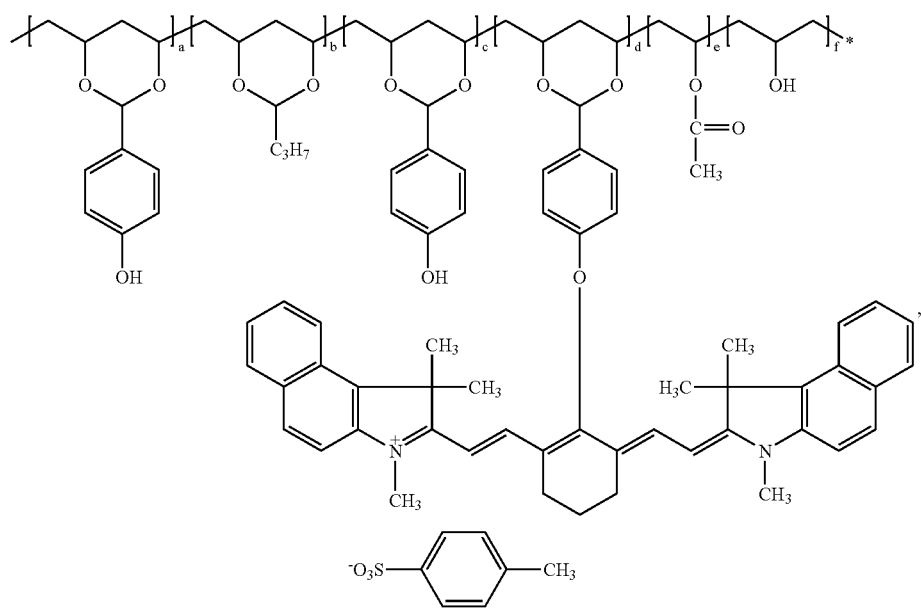

-continued
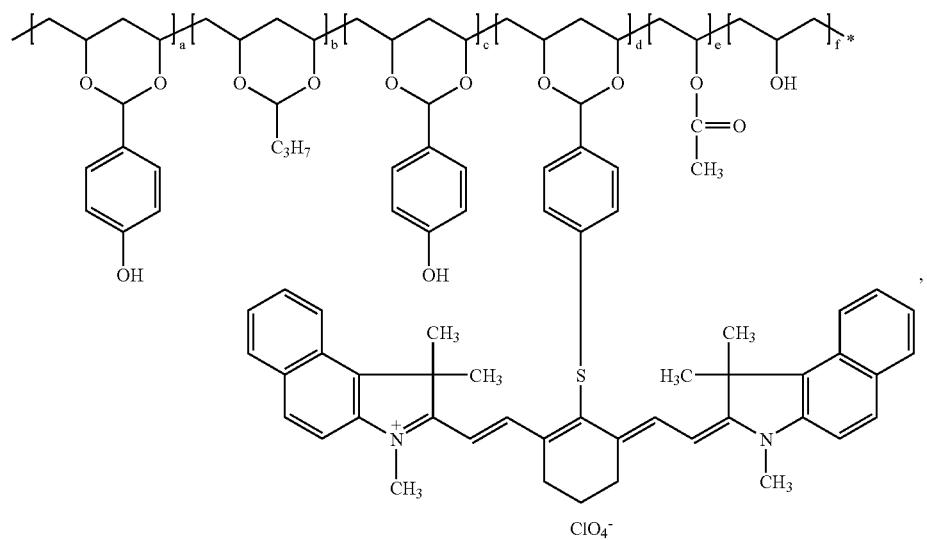
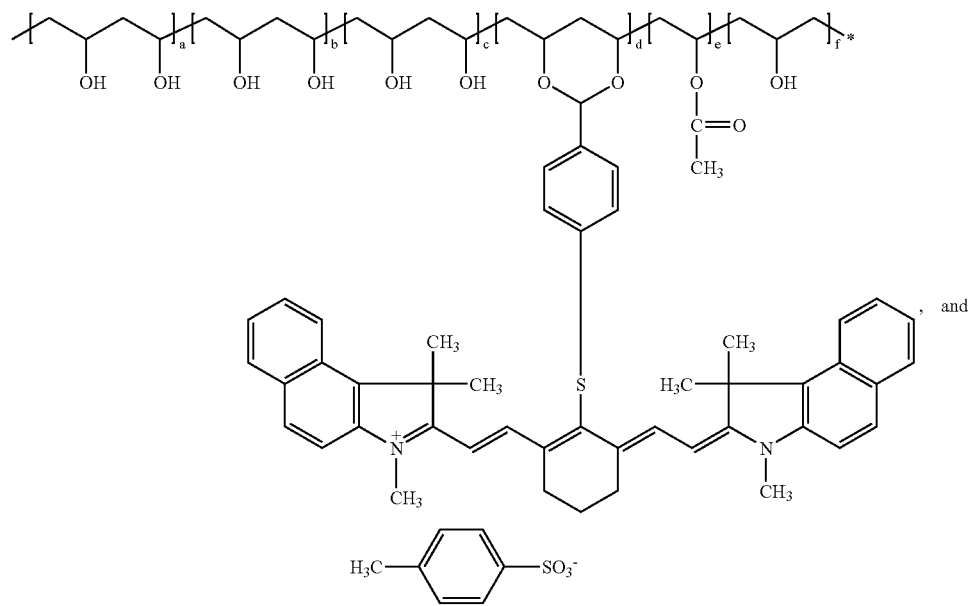

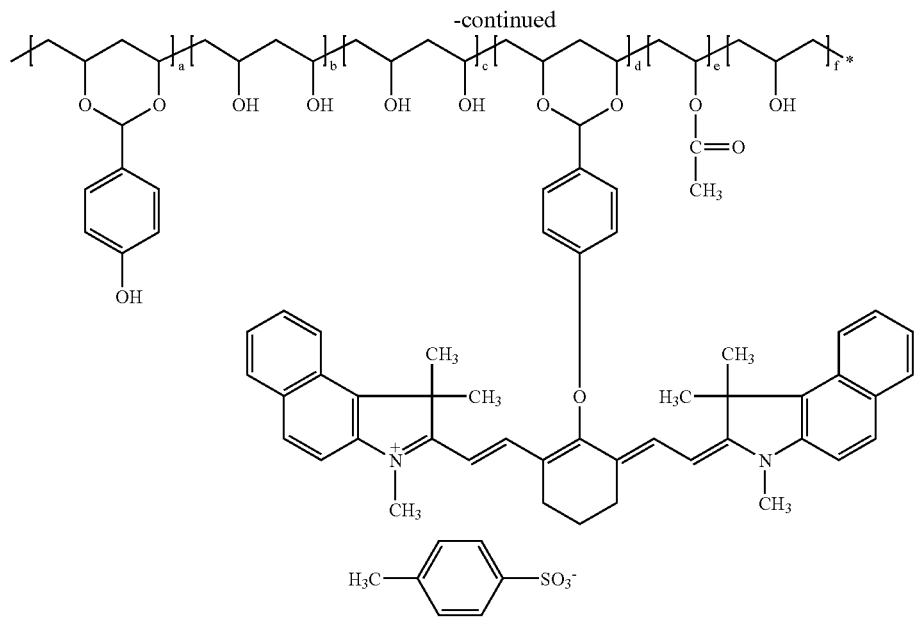

wherein a, b, c, d, e, and f may vary from 0.02 to 0.98.

31. A method of preparing a coating comprising: (a) dissolving the copolymer of claim 1 in a solvent thereby producing a coating mixture and (b) disposing said coating mixture on a substrate.

32. The method of claim 31 wherein said coating is a lithographic printing plate coating, a photoresist coating, a circuit board coating or a chemical sensor coating.

33. A coating comprising a copolymer as defined in claim 1 or a mixture thereof.

34. The coating of claim 33 being a lithographic printing plate coating.

35. The coating of claim 33 being a photoresist coating, a circuit board coating or a chemical sensor coating.

36. The coating of claim 34 comprising from about 10 to about 100% by weight of said copolymer.

37. The coating of claim 34 wherein said coating is disposed on a substrate selected from the group consisting of anodized aluminum, plastic film, polyester film and paper.

38. The coating of claim 34 wherein said coating is a single-layer coating.

39. The coating of claim 38 wherein said coating weights between about 1 and about 5 g/m$^2$.

40. The coating of claim 38 comprising from 0 to about 90% by weight of a polymeric binder resin.

41. The coating of claim 38 comprising from 0 to about 10% by weight of a visible dye.

42. The coating of claim 38 comprising from 0 to about 90% by weight of an image-protecting agent.

43. The coating of claim 34 wherein said coating is a two-layer coating comprising a bottom layer and a top layer.

44. The coating of claim 43 wherein the bottom layer has a solubility in an alkaline developer different from that of the top layer.

45. The coating of claim 43 wherein said bottom layer weights between about 0.2 and about 3.0 g/m$^2$.

46. The coating of claim 43 wherein said bottom layer comprises from about 10 to about 100% by weight of a copolymer as defined in anyone of claims 1 to 30 or a mixture thereof.

47. The coating of claim 46 wherein said copolymer in the bottom layer is soluble in an aqueous solution with a pH between about 1 and about 13.

48. The coating of claims 46 wherein said copolymer in the bottom layer is not soluble in an organic solvent.

49. The coating of claim 48 wherein said organic solvent is ketone or a mixture of ketone and an alcohol.

50. The coating of claim 43 wherein said bottom layer comprises from about 0 to about 90% by weight of a cross-linking agent.

51. The coating of claim 50 wherein said cross-linking agent is selected for the group consisting of ammonium zirconyl acetate, tri-alkoxysilane, tetra-alkoxysilane, hydroxy titanate, hexamethoxymethyl melamine, aldehyde containing compounds and mixture thereof.

52. The coating of claim 43 wherein the top layer comprises from about 10 to about 100% by weight of a copolymer as defined in anyone of claims 1 to 30 or a mixture thereof.

53. The coating of claim 43 wherein the top layer weights between about 1 and about 5 g/m$^2$.

54. The coating of claim 43 wherein said top layer comprises from about 10 to about 90% of a polymeric binder resin.

55. The coating of claim 43 wherein the top layer comprises from 0 to about 10% by weight of a visible dye.

56. The coating of claim 43 wherein the top layer comprises from 0 to about 90% by weight of an image-protecting agent.

57. The coating of claim 40 wherein said polymeric binder resin is a polymer or a copolymer derived from Novolak, acrylate, methacrylate or styrene and contains a functional group selected from the group consisting of hydroxy, carboxylic acid, sulfonic acid, urea, urethane, amido, imido and meleimide.

58. The coating of claim 54 wherein said polymeric binder resin is a polymer or a copolymer derived from Novolak, acrylate, methacrylate or styrene and contains a functional group selected from the group consisting of hydroxy, carboxylic acid, sulfonic acid, urea, urethane, amido, imido and meleimide.

59. The coating of claim 41 wherein said visible dye is selected from the group consisting of basic violet, basic blue and acid blue.

60. The coating of claim 55 wherein said visible dye is selected from the group consisting of basic violet, basic blue and acid blue.

61. The coating of claim 42 wherein said image-protecting agent is a siloxane containing oligomer, polymer or copolymer.

62. The coating of claim 56 wherein said image-protecting agent is a siloxane containing oligomer, polymer or copolymer.

63. A lithographic printing plate comprising a copolymer as defined in claim 1 or a mixture thereof.

64. A photoresist comprising a copolymer as defined in claim 1 or a mixture thereof.

65. A chemical sensor comprising a copolymer as defined in claim 1 or a mixture thereof.

66. A process for preparing a copolymer as defined in claim 1 comprising reacting polyvinyl alcohol with a NIR chromophore containing an aldehyde functional group in the presence of an acid acting as catalyst.

67. The process of claim 66 wherein said chromophore is selected from the group consisting of:

- 2-[2-[2-(4-formylbenzothio)-3-(1,3-dihydro-1,3,3-trimethyl-2H-benz[e]indol-2-ylidene)-ethylidene]-1-cyclohexen-1-yl]-ethenyl]-1,3,3-trimethyl-1H-benz[e]indolium perchlorate,
- 2-[2-[2-[4-(4-formylphenylcarboxamido)benzothio]-3-(1,3-dihydro-1,3,3-trimethyl-2H-benz[e]indol-2-ylidene)-ethylidene]-1-cyclohexen-1-yl]-ethenyl]-1,3,3-trimethyl-1H-benz[e]indolium perchlorate,
- 2-[2-[2-(4-formylbenzothio)-3-(1,3-dihydro-3,3-dimethyl-1-(4-sulfobutyl )-2H-benz[e]indol-2-ylidene)ethylidene]-1-cyclohexen-1-yl]-ethenyl]-3,3-di-methyl-1-(4-sulfobutyl)-1 H-benz[e]indolium,
- 2-[2-[2-(4-formylbenzothio)-3-(1,3-dihydro-1-carboxypropyl-3,3-dimethyl-2H-benz[e]indol-2-ylidene )-ethylidene]-1-cyclohexen-1-yl]-ethenyl]-1-carboxypropyl-3,3-trimethyl-1H-benz[e]indolium 4-methylbenzenesulfonate,
- 2-[2-[2-(4-formylbenzothio)-3-(1,3-dihydro-1,3,3-trimethyl-2H-benz[e]indol-2-ylidene)-ethylidene]-1-cyclohexen-1-yl]-ethenyl]-1,3,3-trimethyl-1 H-benz[e]indolium methylbenzenesulfonate,

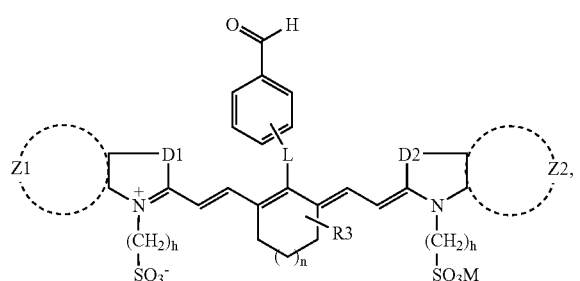

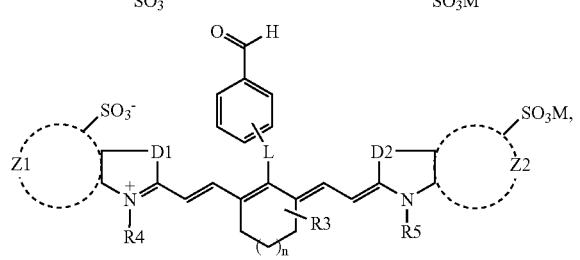

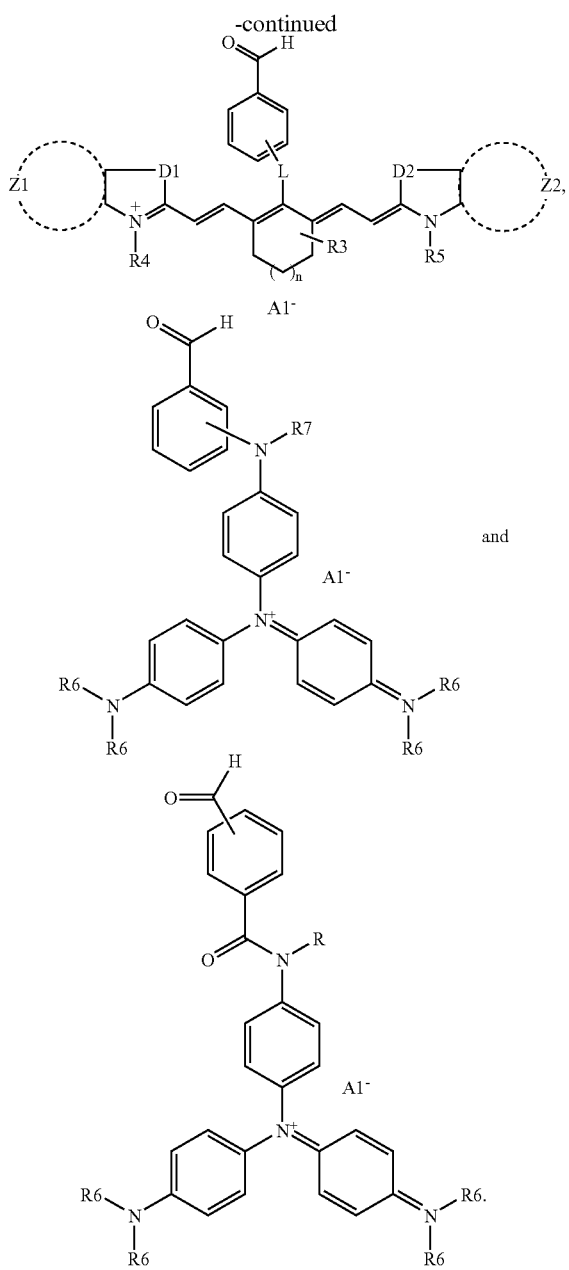

wherein L is S, O, or —CO—NR— and D1, D2, Z1, Z2, R3, R4, R5, R6, R7, M, A1, h and n are as defined in claims 19 to 29.

68. The process of claim 66 wherein the acid is selected from the group consisting of sulfuric acid, hydrochloric acid and toluene sulfonic acid.

69. A process for preparing an copolymer as defined in claim 1 comprising reacting an acetal copolymer containing a first functional group with a NIR chromophore containing a second functional group, wherein:
- when said first functional group is a carboxylic acid, said second functional group is an amino,
- when said first functional group is a amino, said second functional group is an carboxylic acid,
- when said first functional group is a mercapto or a hydroxy, said second functional group is a halide acid, and
- when said first functional group is a halide, said second functional group is a a mercapto or a hydroxy acid.

70. The process of claim 69 wherein said acetal copolymer containing a first functional group is

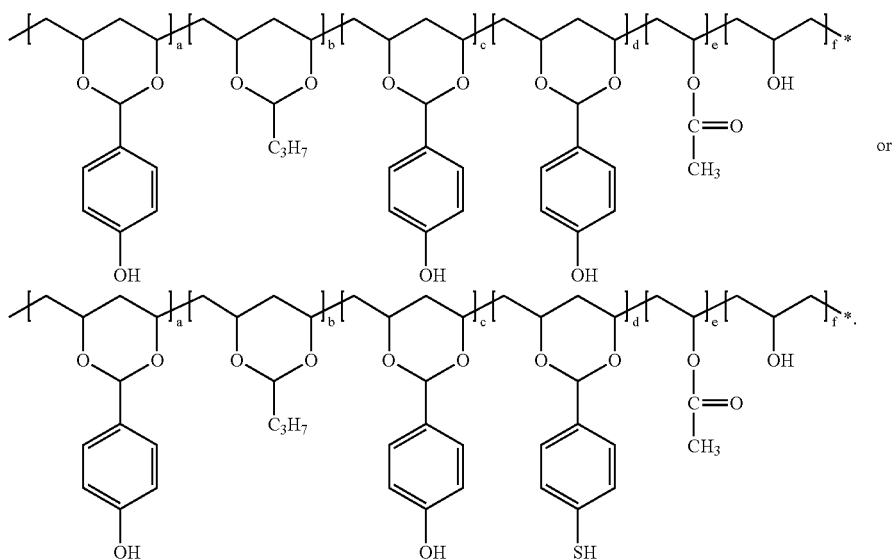

or

71. The process of claim 69 wherein said NIR chromophore containing a second functional group is
2-[2-[2-chloro-3-[2-(1,3-dihydro-1,3,3-trimethyl-2H-benz[e]indol-2-ylidene)-ethylidene]-1-cyclohexen-1-yl]ethenyl]-1,3,3-trimethyl-1 H-benz[e]indolium 4-methylbenzenesulfonate, or 2-[2-[2-chloro-3-[2-(1,3-dihydro-1,3,3-trimethyl-2H-benz[e]indol-2-ylidene)-ethylidene]-1-cyclohexen-1-yl]-ethenyl]-1,3,3-trimethyl-1 H-benz[e]indolium perchlorate.

* * * * *